US011474906B2

(12) United States Patent
Rao et al.

(10) Patent No.: US 11,474,906 B2
(45) Date of Patent: Oct. 18, 2022

(54) METHOD AND SYSTEM FOR PERFORMING DATA PROTECTION SERVICES FOR USER DATA ASSOCIATED WITH CALENDAR GROUPS

(71) Applicant: EMC IP Holding Company LLC, Hopkinton, MA (US)

(72) Inventors: Anjana Rao, Mangalore (IN); Tushar Dethe, Bangalore (IN); Sapna Chauhan, Bangalore (IN); Jigar Premjibhai Bhanushali, Valsad (IN); Sunil Yadav, Bangalore (IN); Amarendra Behera, Bangalore (IN); Shelesh Chopra, Bangalore (IN); Himanshu Arora, Ghaziabad (IN); Vipin Kumar Kaushal, Bharthana (IN); Deependra Pratap Singh, Kanpur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 17/193,168

(22) Filed: Mar. 5, 2021

(65) Prior Publication Data

US 2022/0283906 A1  Sep. 8, 2022

(51) Int. Cl.
*G06F 12/00* (2006.01)
*G06F 11/14* (2006.01)

(52) U.S. Cl.
CPC ...... *G06F 11/1461* (2013.01); *G06F 11/1464* (2013.01); *G06F 11/1469* (2013.01); *G06F 2201/80* (2013.01)

(58) Field of Classification Search
CPC ............ G06F 11/1461; G06F 11/1464; G06F 11/1469; G06F 2201/80; G06F 3/065
See application file for complete search history.

(56) References Cited

U.S. PATENT DOCUMENTS

| 11,169,859 | B2* | 11/2021 | Gelbart | G06F 3/04845 |
| 2012/0284637 | A1* | 11/2012 | Boyer | G06Q 10/109 |
| | | | | 715/751 |
| 2015/0046440 | A1* | 2/2015 | Shoham | G06F 16/335 |
| | | | | 707/728 |

* cited by examiner

*Primary Examiner* — Shawn X Gu
(74) *Attorney, Agent, or Firm* — Chamberlain, Hrdlicka, White, Williams & Aughtry

(57) ABSTRACT

A system for providing data protection services for user data associated with calendar groups generated by an application includes persistent storage for storing user data backups and a manager. The manager is programmed to identify a backup generation event for the user data associated with a calendar group based on a protection policy, obtain user data associated with the backup generation event from the application in response to identifying the backup generation event, select a calendar of calendars included in the user data, obtain user metadata associated with the calendar, generate calendar group information associated with the calendar using the user data and the user metadata, generate a user data backup using the user data, the calendar group information, and the user metadata, in which the user data backup comprises backup data and backup metadata.

20 Claims, 15 Drawing Sheets

METHOD AND SYSTEM FOR PERFORMING DATA PROTECTION SERVICES FOR USER DATA ASSOCIATED WITH CALENDAR GROUPS

BACKGROUND

Computing devices may provide services. To provide the services, the computing devices may include hardware components and software components. When providing services, the devices may generate data. The data may be important to one or more users of the computing devices. The data may require data protection services to avoid data loss and inaccessibility.

SUMMARY

In general, in one aspect, the invention relates to a system for providing data protection services for user data associated with calendar groups generated by an application includes persistent storage for storing user data backups and a manager. The manager is programmed to identify a backup generation event for the user data associated with a calendar group based on a protection policy, obtain user data associated with the backup generation event from the application in response to identifying the backup generation event, select a calendar of calendars included in the user data, obtain user metadata associated with the calendar, generate calendar group information associated with the calendar using the user data and the user metadata, generate a user data backup using the user data, the calendar group information, and the user metadata, in which the user data backup comprises backup data and backup metadata.

In general, in one aspect, the invention relates to a method for providing data protection services for user data associated with calendar groups generated by an application in accordance with one or more embodiments of the invention. The method includes identifying a backup generation event for the user data associated with a calendar group based on a protection policy, obtaining user data associated with the backup generation event from the application in response to identifying the backup generation event, selecting a calendar of calendars included in the user data, obtaining user metadata associated with the calendar, generating calendar group information associated with the calendar using the user data and the user metadata, generating a user data backup using the user data, the calendar group information, and the user metadata, in which the user data backup comprises backup data and backup metadata.

In general, in one aspect, the invention relates to a non-transitory computer readable medium which includes computer readable program code, which when executed by a computer processor enables the computer processor to performs a method for providing data protection services for user data associated with calendar groups generated by an application in accordance with one or more embodiments of the invention. The method includes identifying a backup generation event for the user data associated with a calendar group based on a protection policy, obtaining user data associated with the backup generation event from the application in response to identifying the backup generation event, selecting a calendar of calendars included in the user data, obtaining user metadata associated with the calendar, generating calendar group information associated with the calendar using the user data and the user metadata, generating a user data backup using the user data, the calendar group information, and the user metadata, in which the user data backup comprises backup data and backup metadata.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and method for providing data protection services for user data associated with calendar groups. More specifically, embodiments of the invention relate to generating user data backups of user data generated by an application. The user data backups include user data (i.e., calendars) that are associated with one or more calendar groups and user metadata associated with the calendars. The user data backups enable a manager to perform restorations of user data associated with calendar groups. As a result, users may request to restore calendars under the appropriate calendar group. This improves the efficiency and accuracy of restoring user data associated with calendar groups.

Figure 1A:
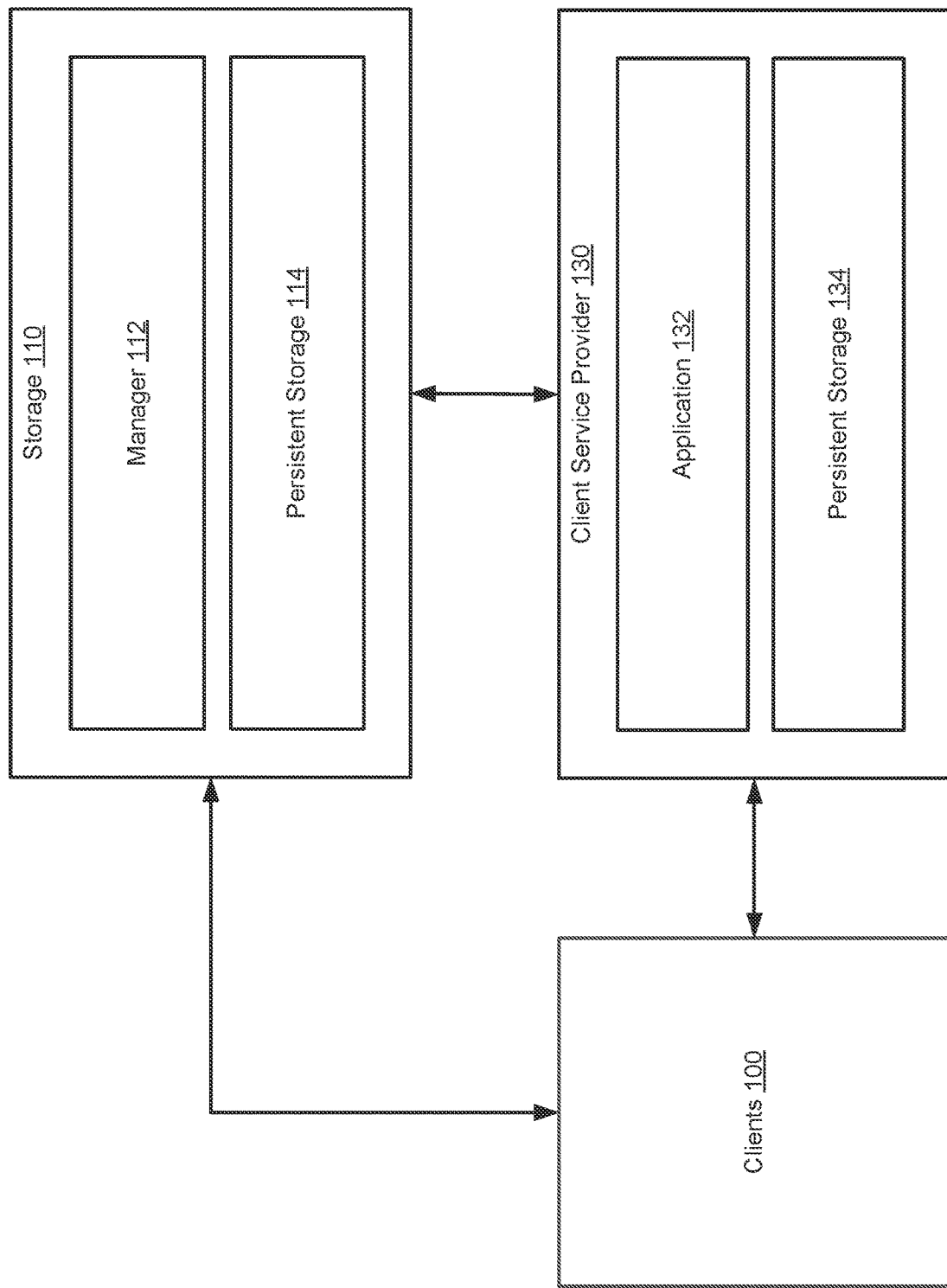
FIG. 1A shows a diagram of a system in accordance with one or more embodiments of the invention.

FIG. 1A shows a diagram of a system in accordance with one or more embodiments of the invention. The system may include any number of clients (100), a storage (110), and a client service provider (130).

The clients (100), operated by users, may utilize services provided by the client service provider (130). For example, the client service provider (130) may provide calendar services. The client service provider (130) may provide other and/or additional services such as data storage services, electronic mail services, instant messaging services, etc. that may be utilized by the clients without departing from the invention. The client service provider (130) may host an application (132) that provides all, or a portion, of the services provided by the client service provider (130).

When the clients (100) utilize the services provided by the client service provider (130), data (e.g., user data) that is relevant to the clients (100) may be stored in persistent storage (134) of the client service provider (130). However, the user data may be lost, become corrupt, inaccessible, or undesirable for other reasons. Therefore, it may be desirable to obtain or store backups of user data. For example, it may be desirable to store such backups in the storage (110) so that if the data stored in the client service provider (130) becomes undesirable, the backups may be used to restore the user data.

However, the application (132) may gate or otherwise restrict access to all, or a portion, of the user data. In other words, additional and/or special methods may be required to obtain the user data to generate user data backups of user data associated with calendar events and/or calendar groups.

To enable the user data of the client service provider (130) to be restored, embodiments of the invention may provide a system that provides backup services and restoration services. By doing so, the user data stored in the client service provider (130) may be restored, or partially restored, to previous forms or desired forms.

The backup services provided by the system of FIG. 1A may include generating user data backups of user data stored on the client service provider (130) that enable granular restorations of user data associated with calendar events and restorations of user data associated with calendar groups. The backup services may also include storing the user data backups in the storage (110) for future use.

The restoration services may include restoring user data on the client service provider (130) to previous point in time using the user data backups stored in the storage (110).

The system may include additional, fewer, and/or different components without departing from the invention. Each component may be operably connected to any of the other components via any combination of wired and/or wireless connections. Each of the components of the system illustrated in FIG. 1A is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3B and 5A-5B. The clients (100) may be implemented using other types of computing devices without departing from the invention. For additional details regarding computing devices, refer to FIG. 7.

The clients (100) may be implemented using logical devices without departing from the invention. For example, the clients (100) may include virtual machines that utilize computing resources of any number of physical computing devices to provide the functionality of the clients (100). The clients (100) may be implemented using other types of logical devices without departing from the invention.

In one or more embodiments of the invention, the clients (100) obtain computer implemented services from the client service provider (130). A computer implemented service may be, for example, managing a database, serving files, and/or other types of computer implemented services that may be utilized by users of the clients. The computer implemented services may be other types of services without departing from the invention.

When using the computer implemented services provided by the client service provider (130), the clients (100) may generate and/or obtain user data which may be stored in the client service provider (130).

For example, when using data database services, the clients (100) may store information from a user in a database. Users of the clients (100) may desire access to the aforementioned information in the future. Consequently, the future availability of the user data stored in the database may be valuable to the users of the clients (100).

Similarly, other entities may desire access to all, or a portion, of the user data stored in the client service provider (130) at future points in time. For example, other entities may desire to obtain access to information in a database hosted by the client service provider (130).

To improve the likelihood that such user data is available in the future, the clients (100) may utilize backup and/or restoration services provided by the storage (110) and/or client service provider (130). As discussed above, the backup and/or restoration services provided by the storage (110) may include the orchestration of user data backup generation, storage of user data backups, and/or using user data backups to restore user data.

When utilizing the backup and/or restoration services provided by the storage (110), the clients (100) may grant permission to the storage (110) to access user data located in the client service provider (130). By doing so, the storage (110) may obtain user data from the client service provider (130) and generate user data backups.

The storage (110) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3B and 5A-5B. The storage (110) may be implemented using other types of computing devices without departing from the invention. For additional details regarding computing devices, refer to FIG. 7.

The storage (110) may be implemented using logical devices without departing from the invention. For example, the storage (110) may include virtual machines that utilize computing resources of any number of physical computing devices to provide the functionality of the storage (110). The storage (110) may be implemented using other types of logical devices without departing from the invention.

In one or more embodiments of the invention, the storage (110) provides backup services and/or restoration services to the clients (100). The backup and/or restoration may include (i) generating user data backups of user data associated with calendar events, (ii) generating user data backups of user data associated with calendar groups, and (iii) restoring user data associated with calendar events and calendar groups using user data backups. The storage (110) may provide other and/or additional services without departing from the invention.

To provide the above noted of the storage (110), the storage (110) may include a manager (112) and persistent storage (114).

The manager (112) may provide the backup and/or restoration services, as discussed above, and/or includes functionality to perform the methods of FIGS. 3A-3B and 5A-5B. The manager (112) may provide other and/or additional services and include other and/or additional functionalities without departing from the invention.

The manager (112) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the manager (112) described throughout this application and/or all or a portion of the methods illustrated in FIGS. 3A-3B and 5A-5B. The manager (112) may be some other physical device without departing from the invention.

The manager (112) may be implemented using computer instructions (e.g., computing code) stored on a persistent storage (e.g., 114) that when executed by a processor of the storage (110) causes the storage (110) to perform the functionality of the manager (112) described throughout this application and/or all or a portion of the methods illustrated in FIGS. 3A-3B and 5A-5B.

The manager (112) may utilize and/or generate data structures stored in the persistent storage (114) of the storage (110). The persistent storage (114) may be implemented using one or more physical storage devices and/or a logical storage device.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (114) provides data storage services. The data storage services may include storing of data and providing of previously stored data. The persistent storage (114) may provide other and/or additional services without departing from the invention. For additional information regarding the persistent storage (114) of the storage (110), refer to FIG. 1B.

The client service provider (130) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3B and 5A-5B. The client service provider (130) may be implemented using other types of computing devices without departing from the invention. For additional details regarding computing devices, refer to FIG. 7.

In one or more embodiments of the invention, the client service provider (130) is implemented using a logical device. The logical device may utilize the computing resources of any number of computing devices and thereby provide the functionality of the client service provider (130) described throughout this application.

In one or more embodiments of the invention, the client service provider (130) hosts an application (132). The application may be a logical entity executed using computing resources (not shown) of the client service provider (130). The application (132) may perform a process. In one or more embodiments of the invention, the application (132) provides a service to users, e.g., the clients (100). The application may be, for example, an instance of a calendar database, an email server, and/or other applications without departing from the invention.

The application (132) may include the functionality to control the access to the user data generated by users of the client service provider (130). The application (132) may, through application programming interface (API) calls, provide portions of the user data to the storage (110) and/or other entities with authorization to access the user data stored on the client service provider (130). The application may include other and/or additional functionality without departing from the invention.

In one or more embodiments of the invention, the application (132) is implemented using computer instructions, e.g., computer code, stored on a persistent storage (e.g., 134) that when executed by a processor(s) of a computing device (see, e.g., FIG. 7) cause the computing device to provide the functionality of the application (132) described throughout this application.

While using the application (132), users may generate and/or obtain user data that may be stored in persistent storage (134). The persistent storage (134) may be implemented using one or more physical storage devices and/or logical storage devices.

A physical storage device may be hard disk drives, solid state disk drives, tape drives, and/or any other physical storage mediums for the storage of data.

The logical storage device (e.g., virtualized storage) may be a logical entity that utilizes any quantity of storage resources of any number of computing devices for storing data. For example, the logical storage device may utilize portions of storage resources provided by any combination of hard disk drives, solid state disk drives, tape drives, and/or any other physical storage medium of any number of computing devices. The logical storage device may be another type of logical storage without departing from the invention.

In one or more embodiments of the invention, the persistent storage (134) provides data storage services. The data storage services may include storing of data and providing of previously stored data. The persistent storage (134) may provide other and/or additional services without departing from the invention. For additional information regarding the persistent storage (134) of the client service provider (130), refer to FIG. 1C.

While the system of FIG. 1A has been described and illustrated as including a limited number of components for the sake of brevity, a system in accordance with embodiments of the invention may include additional, fewer, and/or different components than those illustrated in FIG. 1A without departing from the invention.

Figure 1B:
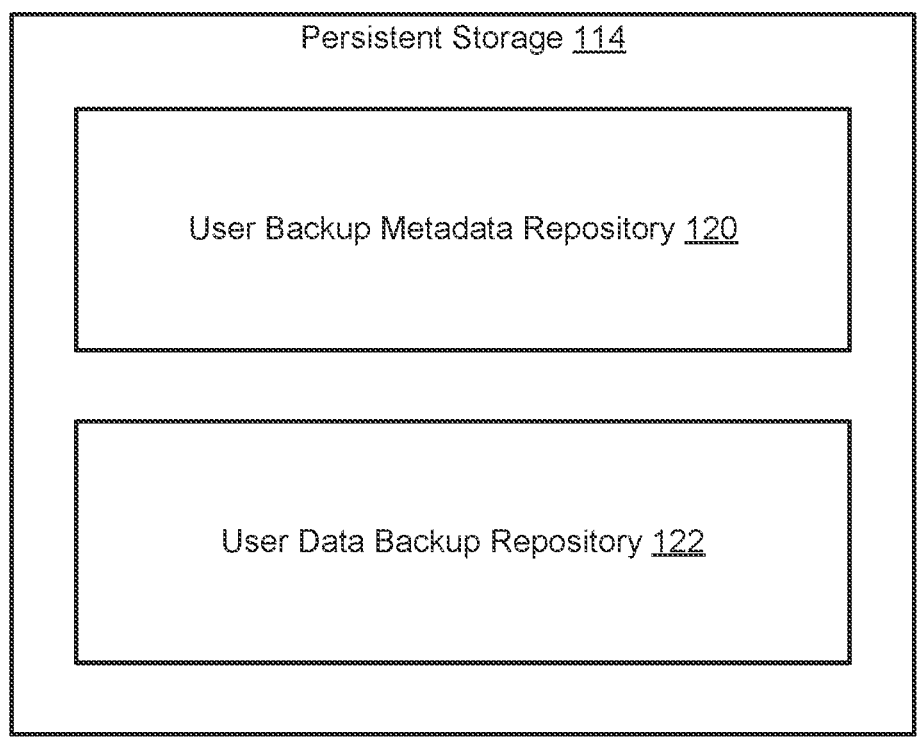
FIG. 1B shows a diagram of persistent storage of a storage in accordance with one or more embodiments of the invention.

As discussed above, the storage (110) in accordance with embodiments of the invention may include persistent storage (114). FIG. 1B shows a diagram of the persistent storage (114) of the storage (110) of FIG. 1A in accordance with one or more embodiments of the invention. As discussed above, the persistent storage (114) may store data structures generated, obtained, and/or used by the manager (112, FIG. 1A). The persistent storage may include a user metadata repository (120) and a user data backup repository (122). Each of these data structures stored in the persistent storage (114) of the storage (110, FIG. 1A) is discussed below.

The user metadata repository (120) may include one or more data structures that may be used to identify, access, and obtain user data stored in persistent storage (134, FIG. 1A) of the client service provider (130, FIG. 1A). The user metadata repository (120) may include user identifiers and user protection policies. The user metadata repository (120) may include other and/or additional information without departing from the invention. The information in the user metadata repository (120) may be obtained by the manager (112, FIG. 1A) of the storage (110, FIG. 1A) directly from the clients (100, FIG. 1A) or from the client service provider (130, FIG. 1A). The manager (112, FIG. 1A) may use the user metadata of the user metadata repository (120) to access a user's user data on the client service provider (130, FIG. 1A) as discussed above. The user metadata repository (120) may be used by the manager (112, FIG. 1A) for other and/or additional purposes without departing from the invention. For additional information regarding the user metadata repository (120), refer to FIG. 2A.

The user data backup repository (122) may include one or more data structures that may be used to restore user data on the client service provider (130, FIG. 1A). The user data backup repository (122) may include user data for one or more users. Each user data may include one or more user data backups. Each user data backup may include backup data and backup metadata. The user data backup repository (122) may include other and/or additional information without departing from the invention. The manager (112, FIG. 1A) of the storage (110, FIG. 1A) may generate the user data backups using user data and user metadata. The manager (112, FIG. 1A) of the storage (110, FIG. 1A) may use the user data backups of the user data backup repository (122) to restore user data on the client service provider (130, FIG. 1A). For additional information regarding the user data backup repository (122), refer to FIG. 2B.

While the data structures (e.g., 120, 122) of the persistent storage (114) of the storage (110, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (114), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 1C:
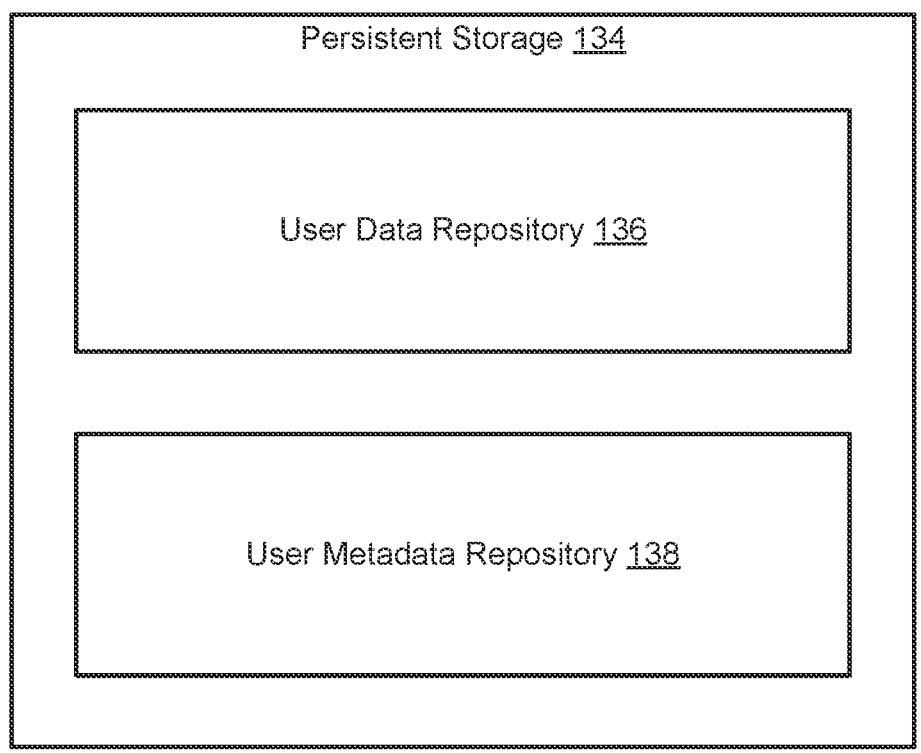
FIG. 1C shows a diagram of persistent storage of a client service provider in accordance with one or more embodiments of the invention.

As discussed above, the client service provider (130, FIG. 1A) in accordance with embodiments of the invention may include persistent storage (134). FIG. 1C shows a diagram of the persistent storage (134) of the client service provider (130) of FIG. 1A in accordance with one or more embodiments of the invention. As discussed above, the persistent storage (134) may store data structures generated by users (e.g., clients (100, FIG. 1A)) of the client service provider (130, FIG. 1A) that may be obtained and/or used by the storage (110, FIG. 1A). The persistent storage (134) of the client service provider (130, FIG. 1A) may include a user data repository (136) and user metadata repository (138). Each of the data structures stored in the persistent storage (134) of the client service provider (130, FIG. 1A) is discussed below.

The user data repository (136) may include one or more data structures that may be used to generate user data backups. The user data repository (136) may include user data generated by users of the client service provider (130, FIG. 1A) as discussed above. The user data may be calendar data. The user data may be other and/or additional types of data such as database data and email data generated by users of the client service provider without departing from the invention. Users (e.g., clients (100)) may use the user data of the user data repository (136) when obtaining computer implemented services from the client service provider (130, FIG. 1A). Additionally, the user data of the user data repository (136) may be obtained by the storage (110, FIG. 1A) for backup generation services. The user data of the user data repository (136) may be used by other and/or additional entities for other and/or additional purposes without departing from the invention.

The user data of the user data repository (136) may be stored in proprietary format that prevents other applications, users and/or other entities from reading and/or using the user data. The user data may not be accessed or used by other users, applications, or other entities without authorization. The user data may be encrypted using encryption keys associated with the application (132, FIG. 1B) and a specific user to secure the user data. The user data of the user data repository (136) may be secured using other security methods without departing from the invention.

In one or more embodiments of the invention, access to the user data repository (136) is gated by one or more applications. In other words, the data included in the user data repository (136) may not be accessed by other entities without utilizing the functionality of the applications that maintain the user data repository (136). For example, the user data repository (136) may include one or more proprietary calendars that are unreadable by entities other than an application (i.e., a calendar application) that maintains the calendars.

In one or more embodiments of the invention, the user data repository (136) includes a database that stores calendars (or other types of message based) communications. The calendars may include calendar events and may be associated with each other by, for example, calendar groups. The aforementioned information may be stored as, for example, user metadata maintained by the database.

In one or more embodiments of the invention, the user data repository (136) only stores and/or allows access to predetermined types and quantities (e.g., not all of the metadata maintained by the database) of metadata regarding the calendars. Consequently, requesting all, or a portion, of the metadata associated with an calendar may not provide sufficient information to determine one or more characteristics of the calendars. Embodiments of the invention may address this, and other user data availability problems, by synthesizing, reconstructing, or otherwise obtaining information regarding the calendars indirectly. For example, a system in accordance with embodiments of the invention may reconstruct information regarding relationships between calendar events that are present but inaccessible by querying or otherwise requesting metadata from an application that gates access (e.g., controls access) to the calendar database.

In one or more embodiments of the invention, the user data repository (136) is gated by an application that includes limited options for populating the user data repository. For example, the application that gates access to the user data repository may only allow information to be added to the user data in predetermined manners.

In one or more embodiments of the invention, the application (132, FIG. 1A) that gates access to the user data repository (136) does not include functionality to perform granular restorations or restorations of user data of the user data repository (136) associated with calendar groups using backups of the user data repository. For example, the application (e.g., the API associated with the application) may only include functionality to (i) add data to the user data repository (136), (ii) remove data from the user data repository (136), (iii) obtain metadata regarding portions of the user data repository (136) (e.g., events, fields or other types of discrete data constructs), and/or (iv) modify existing metadata.

In one or more embodiments of the invention, when data is added to the user data repository (136) using the API, the application treats the data as newly added even if the data is a backup of data that was previously added to the user data repository (136). For example, if a field of a database of the user data repository (136) is extracted using the API, adding the extracted data using the API may cause the application to treat the data as new rather than as a copy of a previous version of the data.

The user metadata repository (138) may include one or more data structures that may be used to generate user data backups. The user metadata repository (138) may include metadata associated with the user data of the user data repository (136). The user metadata repository (138) may include, for example, user data identifiers, creation timestamps, user identifiers, calendar event information, calendar event occurrence information, calendar group information, and other and/or additional information regarding the user data of the user data repository (136) without departing from the invention. The metadata of the user metadata repository (138) may be generated by users (e.g., clients (100)) while using the computer implemented services provided by the client service provider (130, FIG. 1A) or by the application (132, FIG. 1A) of the client service provider (130, FIG. 1A). The users (e.g., clients (100)) may use the metadata of the user metadata repository (138) when obtaining the computer implemented services provided by the client service provider (130, FIG. 1A). Additionally, the storage (110, FIG. 1A) may use the metadata of the user metadata repository (138) to generate user data backups.

While the data structures (e.g., 136, 138) of the persistent storage (134) of the client service provider (130, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention.

Additionally, while illustrated as being stored in the persistent storage (134), any of the aforementioned data structures may be stored in different locations (e.g., in persistent storage of other computing devices, in memory rather than persistent storage, in a combination of memory and persistent storage, etc.) and/or spanned across any number of computing devices without departing from the invention. Any of the aforementioned data structures may be implemented using, for example, lists, tables, linked lists, databases, and/or other types of data structures.

Figure 2A:
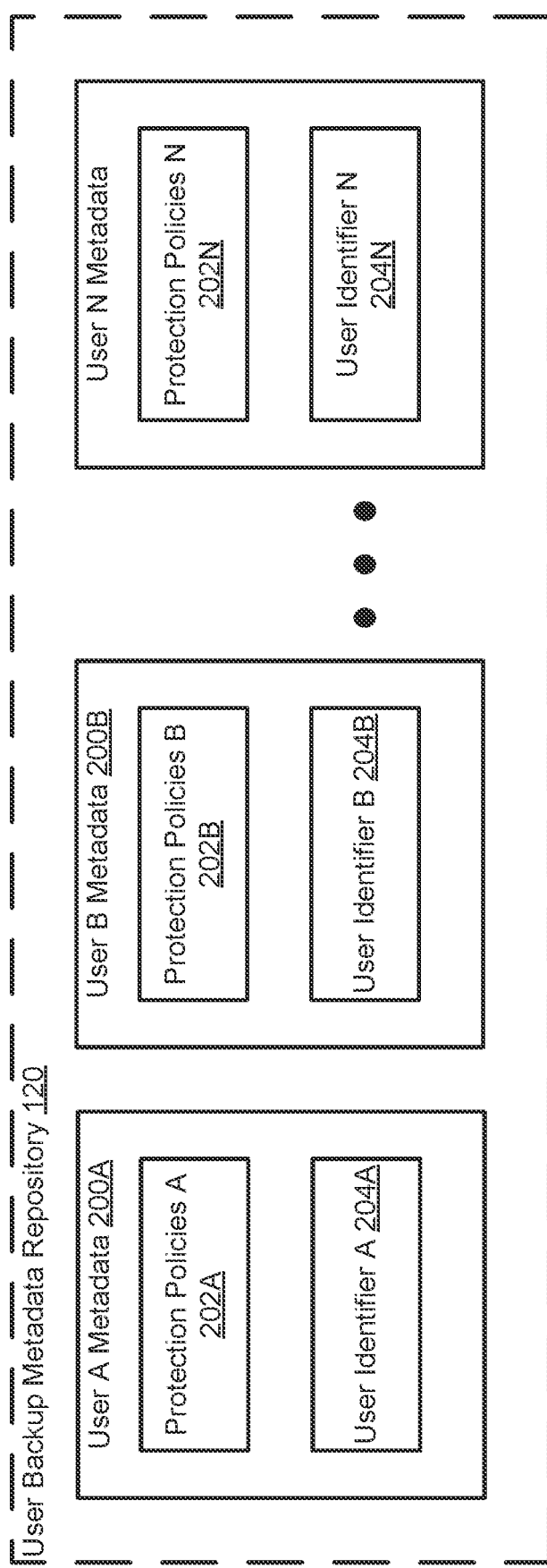
FIG. 2A shows a diagram of a user backup metadata repository in accordance with one or more embodiments of the invention.

As discussed above, the persistent storage of the storage may include a user metadata repository. FIG. 2A shows a diagram of a user metadata repository (120) of FIG. 1B in accordance with one or more embodiments of the invention. As discussed above, the user metadata repository may include information used to access user data stored in the client service provider (130, FIG. 1A). The user metadata repository (120) may include user A metadata (200A), user B metadata (200B), and user N metadata (200N). Each component of the user metadata repository (120) is discussed below.

The user A metadata (200A) may include one or more data structures that may be used to access user data and metadata associated with user A (not shown in FIG. 1A). The user A metadata (200A) may include protection policies A (202A)

and user identifier A (204A). User A metadata (200A) may include other and/or additional information regarding user A without departing from the invention. User A metadata (200A) may be obtained from clients (100, FIG. 1A). The manager (112, FIG. 1A) may send a request to the clients for user A metadata (200A) and, in response to the request, and user A metadata (200A) may be obtained from the clients (100, FIG. 1A). The manager (112, FIG. 1A) of the storage (110, FIG. 1A) may use user A metadata to obtain user A data and associated metadata from the user data repository (136, FIG. 1C) and the user metadata repository (138, FIG. 1C). User A metadata (200A) may be used by other and/or additional entities for other and/or additional purposes without departing from the invention.

The user B metadata (200B) may include one or more data structures that may be used to access user data and metadata associated with user B (not shown in FIG. 1A). The user B metadata (200B) may include protection policies B (202B) and user identifier B (204B). User B metadata (200B) may include other and/or additional information regarding user B without departing from the invention. User B metadata (200B) may be obtained from clients (100, FIG. 1A). The manager (112, FIG. 1A) may send a request to the clients for user B metadata (200B) and, in response to the request, and user B metadata (200B) may be obtained from the clients (100, FIG. 1A). The manager (112, FIG. 1A) of the storage (110, FIG. 1A) may use user B metadata to obtain user B data and associated metadata from the user data repository (136, FIG. 1C) and the user metadata repository (138, FIG. 1C). User B metadata (200B) may be used by other and/or additional entities for other and/or additional purposes without departing from the invention.

The user N metadata (200N) may include one or more data structures that may be used to access user data and metadata associated with user N (not shown in FIG. 1A). The user N metadata (200N) may include protection policies N (202N) and user identifier N (204N). User N metadata (200N) may include other and/or additional information regarding user N without departing from the invention. User N metadata (200N) may be obtained from clients (100, FIG. 1A). The manager (112, FIG. 1A) may send a request to the clients for user N metadata (200N) and, in response to the request, and user N metadata (200N) may be obtained from the clients (100, FIG. 1A). The manager (112, FIG. 1A) of the storage (110, FIG. 1A) may use user N metadata to obtain user N data and associated metadata from the user data repository (136, FIG. 1C) and the user metadata repository (138, FIG. 1C). User N metadata (200N) may be used by other and/or additional entities for other and/or additional purposes without departing from the invention.

The protection policies (e.g., 202A, 202B, 202N) may include one or more data structures that may be used to establish user data protection guidelines and requirements. The protection policies (e.g., 202A, 202B, 202N) may include information that denotes a user data backup schedule, user data backup types, and retention periods. The user data backup schedule may specify when a user data backup is to be generated. The user data backup types may specify what type of user data backup is to be generated (e.g., a full user data backup). The retention period may specify an amount of time a user data backup may not be modified and/or deleted from the storage (110, FIG. 1A). The protection policies (e.g., 202A, 202B, 202N) may include other and/or additional information that provides guidelines for protecting user data without departing from the invention. The protection policies (e.g., 202A, 202B, 202N) may be obtained from the users of the clients (100, FIG. 1A). The manager (112, FIG. 1A) may use protection policies (e.g., 202A, 202B, 202N) to determine when and how to generate user data backups. The protection policies (e.g., 202A, 202B, 202N) may be used by other and/or additional entities for other and/or additional purposes without departing from the invention.

The user identifiers (e.g., 204A, 204B, 204N) may include one or more data structures that may be used to identify a specific user of the clients (100, FIG. 1A). The user identifiers (e.g., 204A, 204B, 204N) may include a global, unique character string or a bit string that is associated with a specific user. The user identifiers (e.g., 204A, 204B, 204N) may include other and/or additional information that may be used to identify a specific user of the clients (100, FIG. 1A) without departing from the invention. The user identifiers (e.g., 204A, 204B, 204N) may be obtained upon request from the clients (100, FIG. 1A). The manager (112, FIG. 1A) may use the user identifiers (e.g., 204A, 204B, 204N) to identify user data associated with a specific user of the clients (100, FIG. 1A). The user identifiers (e.g., 204A, 204B, 204N) may be used by other and/or additional entities for other and/or additional purposes without departing from the invention.

While the data structures (e.g., 200A, 200B, 200N) of the user metadata repository (120) of the persistent storage (114, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 2B:
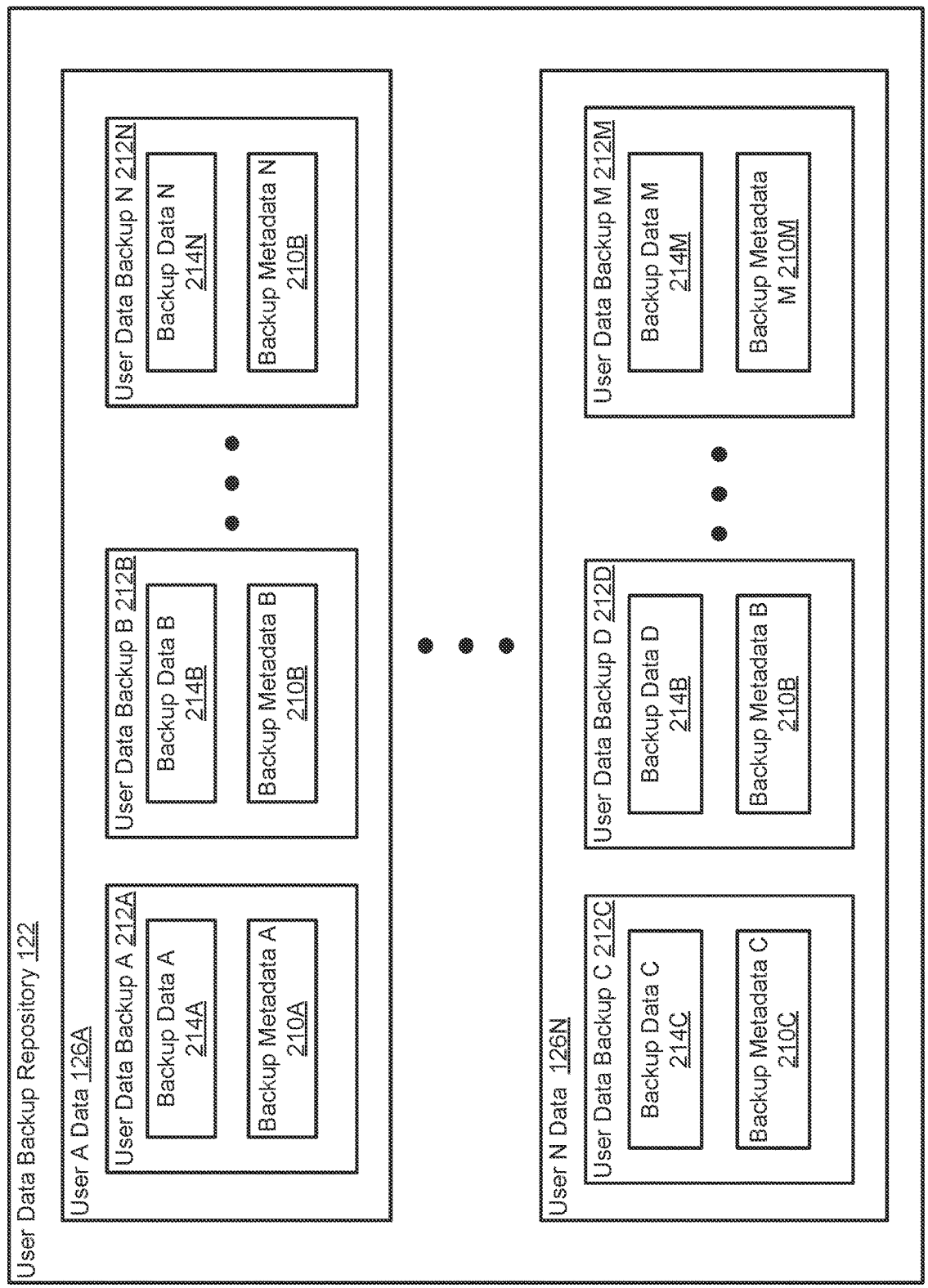
FIG. 2B shows a diagram of a user data backup repository in accordance with one or more embodiments of the invention.

As discussed above, the persistent storage of the storage (110, FIG. 1A) may include a user data backup repository (122). FIG. 2B shows a diagram of a user data backup repository (122) of FIG. 1B in accordance with one or more embodiments of the invention. As discussed above, the user data backup repository may include information used to restore user data in the client service provider (130, FIG. 1A). The user data backup repository (122) may include user A data (126A) and user N data (126N). Each component of the user data backup repository (122) is discussed below.

The user A data (126A) may include one or more data structures that may be used to restore user data associated with user A (not shown in FIG. 1A). The user A data (126A) may include one or more backups (i.e., user data backup A (212A), user data backup B (212B), user data backup N (212N)). Each backup may include backup data (e.g., backup data A (214A), backup data B (214B), and backup data N (214N)) and backup metadata (e.g., backup metadata A (210A), backup metadata B (210B), backup metadata N (210N)). User A data (126A) may include other and/or additional information regarding user A data without departing from the invention. User A data (126A) may be generated using user data and user metadata from the client service provider (130, FIG. 1A). User A data (126A) may be used by the storage (110, FIG. 1A) to restore inaccessible user A data in the client service provider (130, FIG. 1A) as discussed above. User A data (126A) may be used by other and/or additional entities for other and/or additional purposes without departing from the invention.

The user N data (126N) may include one or more data structures that may be used to restore user data associated with user N (not shown in FIG. 1A). The user N data (126N)

may include one or more backups (i.e., user data backup C (212C), user data backup D (212D), user data backup M (212M)). Each backup may include backup data (e.g., backup data C (214C), backup data D (214D), and backup data M (214M)) and backup metadata (e.g., backup metadata C (210C), backup metadata D (210D), backup metadata M (210M)). User N data (126N) may include other and/or additional information regarding user N data without departing from the invention. User N data (126N) may be generated using user data and user metadata obtained from the client service provider (130, FIG. 1A). User N data (126N) may be used by the storage (110, FIG. 1A) to restore inaccessible user N data in the client service provider (130, FIG. 1A) as discussed above. User N data (126N) may be used by other and/or additional entities for other and/or additional purposes without departing from the invention.

As discussed above, each user data (e.g., 126A) may include one or more user data backups (e.g., 212A, 212B, 212N) and each user data backup (e.g., 212A) may include both backup data (e.g., 214A) and backup metadata (e.g., 210A). The backup data (e.g., 214A) may include user data obtained from the client service provider (130, FIG. 1A) that has been associated with backup metadata (e.g., 210A), and is therefore, able to be used to restore inaccessible user data associated with the backup (e.g., 214A). The backup metadata (e.g., 210A) may be generated by the manager (112, FIG. 1A) and include user metadata obtained from the client service provider (130, FIG. 1A). The backup metadata (e.g., 210A) may include information regarding the user data included in the backup data (e.g., 214A). For additional information regarding backup metadata (e.g., 210A), refer to FIG. 2C).

While the data structures (e.g., 126A, 126N) of the user data backup repository (122) of the persistent storage (114, FIG. 1A) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 2C:
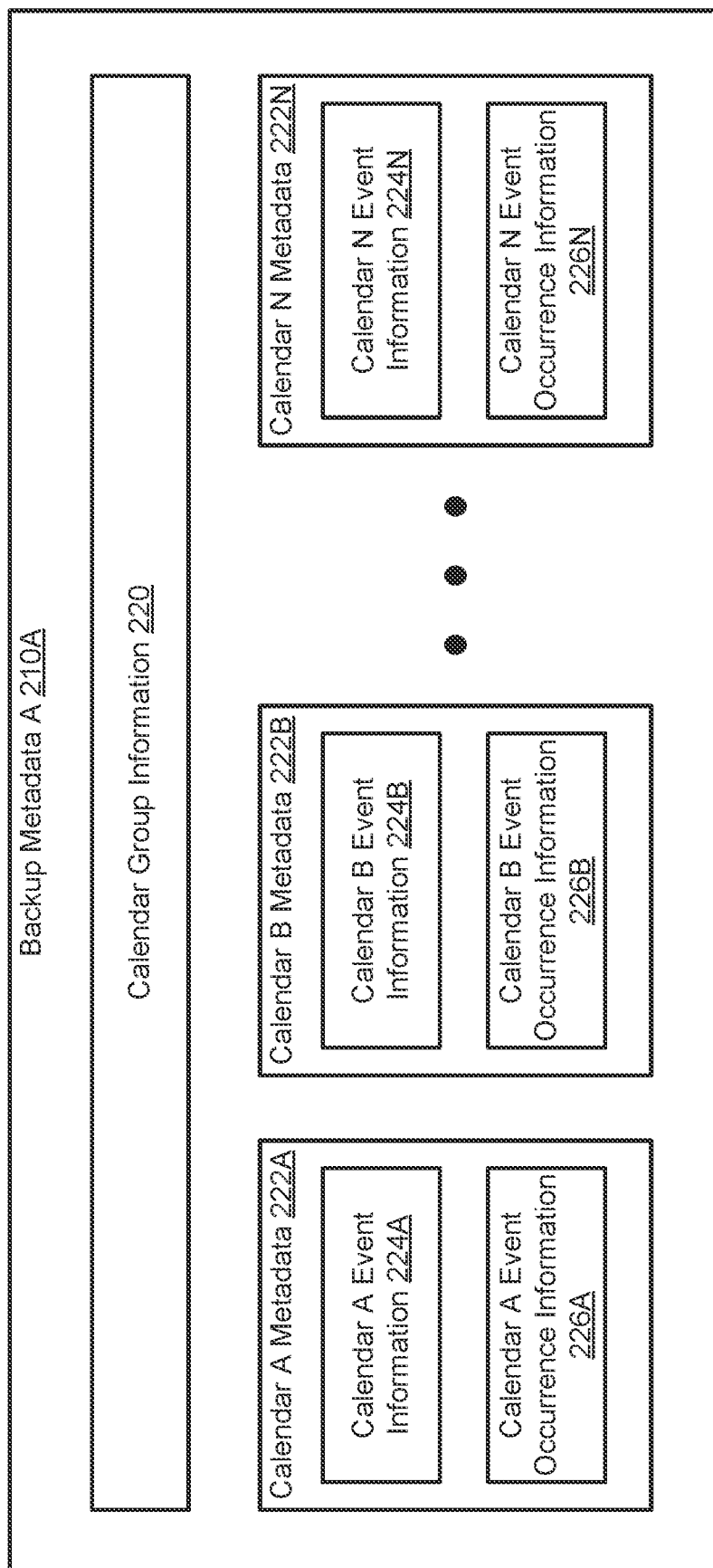
FIG. 2C shows a diagram of a backup metadata in accordance with one or more embodiments of the invention.

As discussed above, the user data backup repository may include backup metadata. FIG. 2C shows a diagram of backup metadata A (210A) of FIG. 2B in accordance with one or more embodiments of the invention. As discussed above, backup metadata A (210A) may include information associated with backup data A (214A, FIG. 2B) and may be used to restore user data in the client service provider (130, FIG. 1A). Backup metadata A (210A) may include calendar group information (220) and calendar metadata associated with each calendar included in the user data backup, (e.g., calendar A metadata (222A), calendar B metadata (222B), and calendar N metadata (222N)). Backup metadata A (210A) may include other and/or additional information regarding backup data A (214A, FIG. 2B) without departing from the invention. Each component of the backup metadata A (210A) is discussed below.

The calendar group information (220) may include one or more data structures that includes a calendar group topology regarding the one or more calendars included in backup A (214A, FIG. 2B). The calendar group information (220) may specify, for example, a hierarchy of calendars and the associated calendar group identifiers of each calendar included in backup data A (214A, FIG. 2B). The calendar group information (220) may include calendar identifiers (e.g., a unique global bit string associated with a calendar) and calendar group identifiers. The calendar group information may be generated by associating each calendar identifier with its parent calendar group identifier. Each user may include user root calendar group, under which all calendars and calendar subgroups associated with the user reside. The calendar group information may be generated by the manager (112, FIG. 1A) using user metadata from the user metadata repository (138, FIG. 1C) and/or user data from the user data repository (136, FIG. 1C). The calendar group information (220) may be used by the manager to restore inaccessible user A data stored in the client service provider (130, FIG. 1A) associated with backup A (214A, FIG. 2B) in a manner in which the calendars are restored under appropriate calendar groups. The calendar group information (220) may be used by other and/or additional entities for other and/or additional purposes without departing from the invention.

The calendar metadata (e.g., 222A, 222B, 222N) may be one or more data structures that includes calendar event information (e.g., calendar A event information (224A), calendar B event information (224B), and calendar N event information (224N)) and calendar event occurrence information (e.g., calendar A event occurrence information (226A), calendar B event occurrence information (226B), and calendar N event occurrence information (226N)) associated with each event included in the calendar. The calendar event information (e.g., 224A, 224B, 224N) may specify an event type associated with each event included in a calendar. The event type may be a meeting, an all-day event, an appointment, an online event, and/or other and/or additional types of events without departing from the invention. The calendar event occurrence information (e.g., 226A, 226B, 226N) may specify an occurrence associated with each event of a calendar. An occurrence may specify whether a calendar event is a single occurrence event or a re-occurring event. The calendar event information (e.g., 224A, 224B, 224N) and the calendar event occurrence information (e.g., 226A, 226B, 226N) may be generated by the manager (112, FIG. 1A) during the generation of the user data backup associated with backup metadata A (210A) and may be used by the manager (112, FIG. 1A) to perform a granular restoration of user data associated with backup metadata A (210A).

While the data structures (e.g., 220, 222A, 222B, 222N) of backup metadata A (210A) of the user data backup repository (122, FIG. 2B) are illustrated as separate data structures and have been discussed as including a limited amount of specific information, any of the aforementioned data structures may be divided into any number of data structures, combined with any number of other data structures, and may include additional, less, and/or different information without departing from the invention. Any of the aforementioned data structures may be implemented using, for example, lists, tables, linked lists, databases, and/or other types of data structures.

Figure 3A:
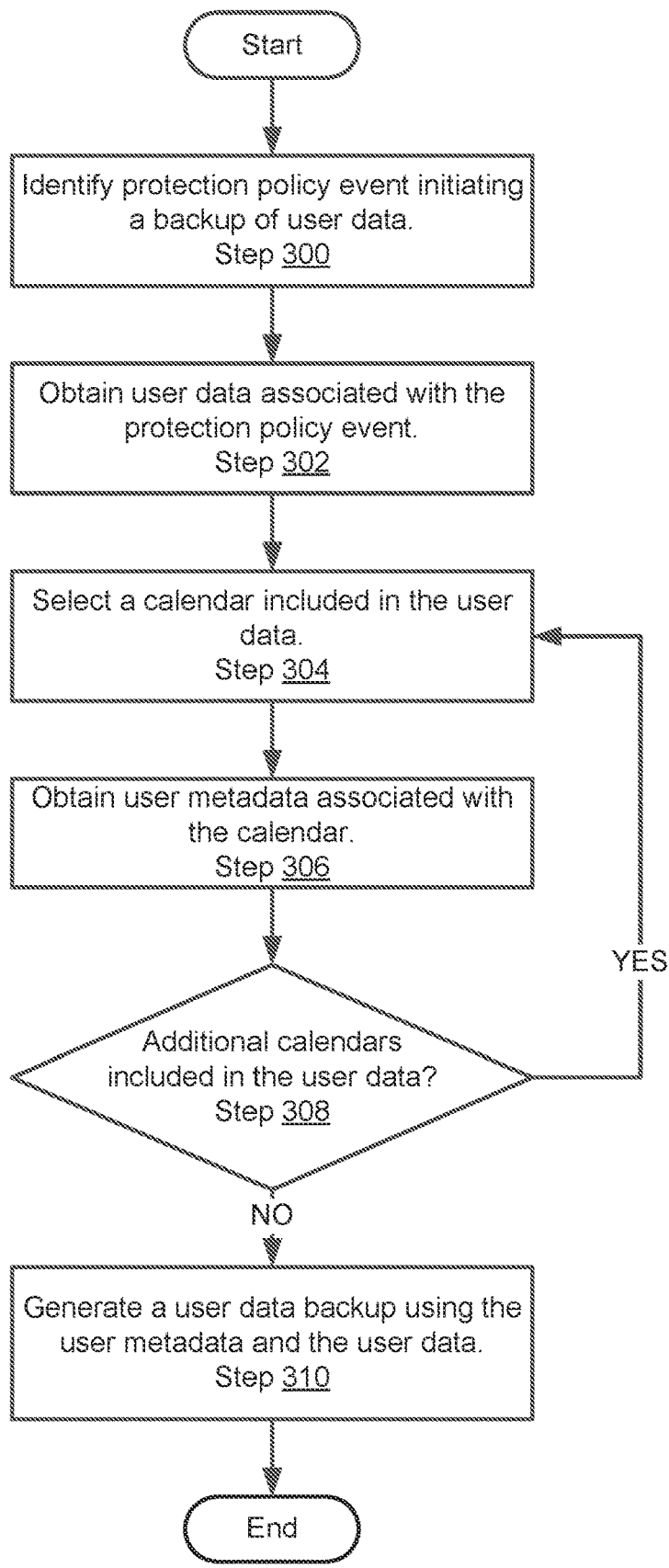
FIG. 3A shows a flowchart of a method of generating user data backup of user data associated with calendar events in accordance with one or more embodiments of the invention.

FIG. 3A shows a flowchart of a method of generating a user data backup of user data associated with calendar events in accordance with one or more embodiments of the invention. The method may be performed by, for example, a manager (112, FIG. 1A) of the storage (110, FIG. 1A). Other components of the system in FIG. 1A may perform all, or a portion, of the method of FIG. 3A without departing from the invention.

While FIG. 3A is illustrated as a series of steps, any of the steps may be omitted, performed in a different order, additional steps may be included, and/or any or all of the steps may be performed in a parallel and/or partially overlapping manner without departing from the invention.

In step 300, a protection policy event initiating a backup of user data is identified.

As discussed above, protection policies may specify guidelines and/or requirements for protecting user data stored on the client service provider. The protection policies may specify events that trigger backups of user data. The manager of the storage may monitor the protection policies and identify the occurrence of the specified events in the protection policies. In response to the identification of the protection policy events, the manager of the storage may initiate the generation of a backup of user data.

For example, a protection policy may specify that user data of a user should be backed up once a week at noon on Sunday. The manager of the storage may monitor this protection policy as well as the time and date, and at noon every Sunday, may initiate backup generation of user data associated with the protection policy. The protection policy event initiating a backup of user data may be identified via other and/or additional methods without departing from the invention.

In step 302, user data associated with the protection policy event is obtained.

In one or more embodiments of the invention, the manager of the storage sends application interface programming (API) calls to the application of the client service provider to obtain the user data associated with the protection policy event. The user data may refer to information returned by the application that gates access to the user data repository in response to a query (e.g., an API call). The API calls may include requests for user data stored in a user data repository of the client service provider associated with a user based on a user identifier. More specifically, the API calls may include requests for user data associated with a user that include creation timestamps after the timestamp of the most recent previous backup associated with the user data. One or more API calls may be made to the client service provider to obtain the user data without departing from the invention. The user data associated with the protection policy event may be obtained via other and/or additional methods without departing from the invention.

The API calls may include requests for user data based on timestamp analysis. A first API call may request a list of object identifiers associated with user data objects stored in the user data repository that were generated after a specific point in time. In response to the request, the client service provider may send a list of object identifiers associated with objects that were generated after the specified point in time. The storage may send additional API calls requesting the user data that are associated with the obtained object identifiers. In response to obtaining the API calls, the client service provider may send the requested user data to the storage. User data associated with the protection policy event may be obtained from the user data repository via other and/or additional methods without departing from the invention.

For example, a protection policy event may specify that a backup of user data is to be generated once a week at noon on Sunday. The manager may send one or more API calls requesting user data associated with the protection policy event. The API calls may request all user data generated after noon of the previous Sunday. In response to the API calls, the client service provider may identify user data generated after noon of the previous Sunday and send the identified user data to the storage.

When user data is obtained in step 302, the user data may be without context. For example, metadata that provide context for the user data may not be provided along with or otherwise in conjunction with the user data. Thus, the user data obtained in step 302 is fragmented with respect to other user data in the user data repository, backups of the user data repository, etc. Thus, the user data obtained in step 302, in isolation, may not be usable for backup generation purposes.

In step 304, a calendar included in the user data is selected.

As discussed above, the obtained user data may include data of one or more calendars associated with a user. The obtained user data may include a list of one or more calendar identifiers for which the calendars included in the user data may be associated. The manager of the storage may use the calendar identifiers included in the obtained user data to identify the calendars included in the user data. Thus, the calendar identifiers may be used to select a calendar included in the obtained user data to obtain user metadata associated with the selected calendar for generating a user data backup. The calendar may be selected and the user metadata for generating a user data backup may be identified based on the obtained user data via other and/or additional methods without departing from the invention.

For example, consider a scenario where the user data repository is a calendar database including calendars. Each of the calendars may be associated with a corresponding identifier (e.g., a reference to an entry in the database that includes the respective calendar information). The obtained user data may be two calendars. To use the calendars for restoration purposes, the identifiers of the corresponding database entries must be known. In this scenario, the user metadata may include the references to the database entries in which the calendars are stored. Consequently, when a restoration is performed, the reference to the entries may be provided along with the copy of the calendar data (e.g., calendar events) of the calendars to enable the entry of the database to be restored to an earlier state by, for example, overwriting the entry's contents, adding a new entry and changing its metadata to replace the previous entry, etc. The manager may select the first calendar identifier included in the list of calendar identifiers that was not previously selected. The calendar associated with the calendar identifier may be the selected calendar.

In step 306, user metadata associated with the calendar is obtained.

In one or more embodiments of the invention, the manager of the storage sends API calls to the application of the client service provider to obtain the identified user metadata associated with the user data associated with the selected calendar. The manager may send one or more API calls to the application of the client service provider. The API calls may include requests for user metadata that is associated with the selected calendar identifier that is stored in the user metadata repository in the client service provider. In response to obtaining the API calls, the application of the client service provider may send the requested user metadata to the storage. The user metadata associated with the calendar may be obtained via other and/or additional methods without departing from the invention.

In step 308, a determination is made as to whether there are additional calendars included in the user data.

As discussed above, the user data obtained in step 302 may include a list of calendar identifiers associated with calendars included in the obtained user data. After obtaining the user metadata associated with the previously selected calendar, the manager may identify the next calendar identifier included in the list of calendar identifiers, and thus determine that additional calendars are included in the user data. If there are no additional calendar identifiers and/or all of the calendar identifiers included in the list were previously selected, the manager may determine that there are no additional calendars are included in the user data. It may be determined whether additional calendars are included in the user data via other and/or additional methods without departing from the invention.

If it is determined that additional calendars are included in the user data, then the method proceeds to step 304. If it is determined that additional calendars are not included in the user data, then the method proceeds to step 310. Steps 304, 306, and 308 may be repeated until user metadata associated with each calendar included in the user data obtained in step 302 is obtained without departing from the invention.

In step 310, a user data backup is generated using the user metadata and the user data.

In one or more embodiments of the invention, the user data backup is generated by generating backup metadata using the user data and the user metadata and associated portions of the user data with portions of the backup metadata. As discussed above, the backup metadata may include calendar event information and calendar event occurrence information. The manager of the storage may generate calendar event information and calendar event occurrence information associated with each calendar included in the user data. The user metadata may include event information associated with each event specified by a user upon the creation of the event in a calendar. The manager may identify this information and generate calendar event information and calendar event occurrence information for each event of each calendar using the identified information. For each calendar, the manager may identify calendar event identifiers and use the user metadata to assign a calendar event type to the event associated with the calendar event identifier and calendar event occurrence information that may specify whether the event is a single occurrence event or a reoccurring event. The backup metadata may be generated via other and/or additional methods without departing from the invention.

For example, for a calendar included in the user data, the manager identifies all calendar event identifiers associated with the calendar. The user metadata may include a list of calendar event identifiers associated with the calendar. The user metadata may include calendar entries associated with each calendar event generated by the user upon the creation of each event. In this scenario, this calendar includes two events. The first event is a meeting that occurs only once and the second event is an annual all-day event that occurs each year. The user metadata associated with the first event may specify a single time entry generated by the user upon the creation of the first event. The manager may assign the meeting calendar type to the calendar event identifier and generate calendar specification information that specifies the calendar event associated with the calendar identifier is a single occurrence event. The user metadata associated with the second event may specify a first entry that indicates the second event lasts twenty four hours and a second entry that indicates the event occurs on the same day each year. The manager assigns the all-day event calendar type to the calendar event identifier and generates calendar specification information that specifies the calendar event associated with the calendar identifier is a reoccurring event.

In one or more embodiments of the invention, each portion of the backup metadata is associated with a portion of the user data to generate a user data backup. Portions of the user data that include an event may be associated with portions of the calendar event information and calendar event occurrence information of the backup metadata. The user data backup may be generated by associating the user data with the backup metadata via other and/or additional methods without departing from the invention.

For example, the manager of the storage may generate a user data backup that includes a list for each calendar event included in the user data of the user data backup. For each calendar event, the list may include references to the calendar in the user data in which the calendar event is included and all of the backup metadata associated with the calendar event.

The method may end following step 310.

Figure 3B:
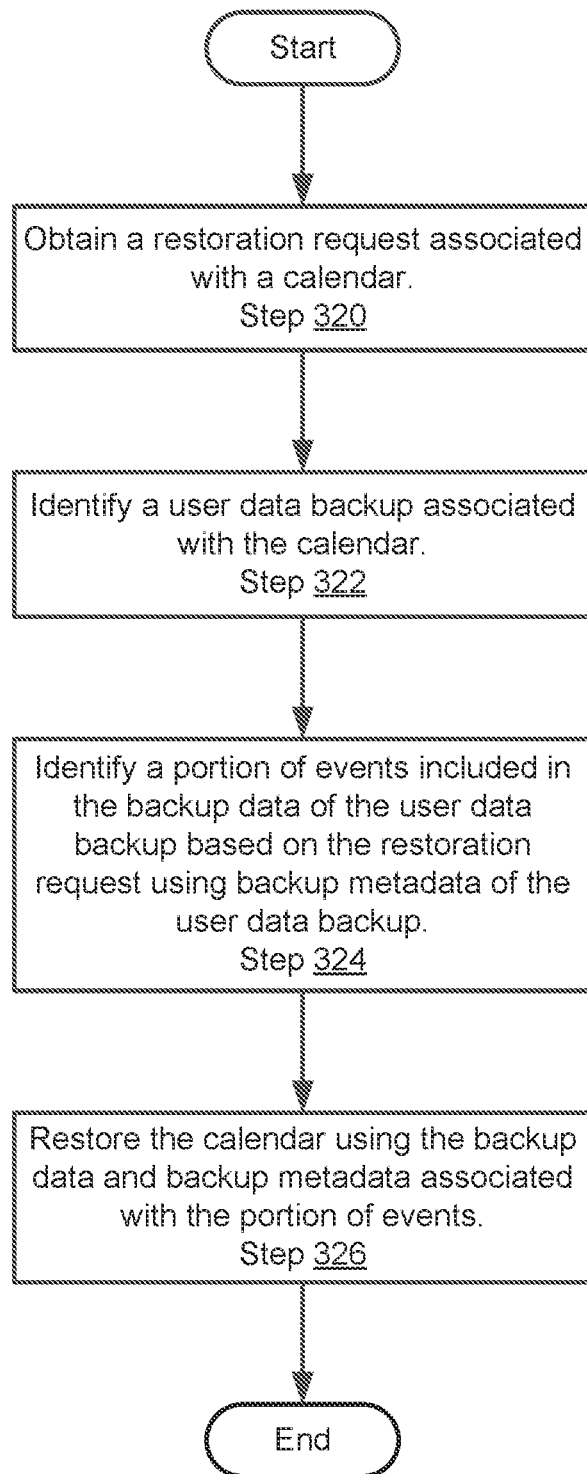
FIG. 3B shows flowchart of a method of restoring user data associated with calendar events using a user data backup in accordance with one or more embodiments of the invention.

FIG. 3B shows flowchart of a method of restoring user data associated with calendar events using a user data backup in accordance with one or more embodiments of the invention. The method may be performed by, for example, a manager (112, FIG. 1A) of the storage (110, FIG. 1A). Other components of the system in FIG. 1A may perform all, or a portion, of the method of FIG. 3B without departing from the invention.

While FIG. 3B is illustrated as a series of steps, any of the steps may be omitted, performed in a different order, additional steps may be included, and/or any or all of the steps may be performed in a parallel and/or partially overlapping manner without departing from the invention.

In step 320, a restoration request associated with a calendar is obtained.

User data stored on the client service provider may become inaccessible for any reason. The client service provider or a component within the client service provider may perform or initiate a restoration that may be associated with a user data backup stored in the storage. Obtaining the restoration request may include receiving a message from the application of the client service provider and/or a user of the clients that requests the restoration of inaccessible user data using a user data backup. The message may include a user identifier and a calendar identifier to specify the user data backup requested by the application of the client service provider. The manager of the storage may identify the message from the client service provider as a restoration request and, in response to obtaining the restoration request, the manager of the storage may initiate the restoration using the specified user data backup. A restoration request associated with a user data backup may be obtained via other and/or additional methods without departing from the invention.

In one or more embodiments of the invention, a restoration request may specify a portion of the user data backup to be used to restore the user data instead of restoring the inaccessible user data with the entire user data. A user may desire to restore a calendar with only a portion of the calendar events included in the original calendar. The restoration request may specify one or more calendar event types and calendar event occurrence information associated with only desired calendar events to be restored using the user data backup.

In step 322, a user data backup associated with the calendar is identified.

In one or more embodiments of the invention, the manager identifies the user data backup associated with the calendar using the user identifier and the calendar identifier. The manager may identify the most recent user data backup by matching the user identifier included in the restoration request with the user identifier included in the most recent user data backup that also includes the calendar identifier.

The user data backup associated with the calendar may be identified via other and/or additional methods without departing from the invention.

In step 324, a portion of calendar events included in the backup data of the user data backup are identified based on the restoration request using the backup metadata of the user data backup.

As discussed above, the restoration request may specify one or more calendar event types and calendar event occurrence information associated with calendar events that a user desires to restore. The manager may use the backup metadata to identify portions of backup data (i.e., user data) associated with calendar events that include the calendar event type(s) and calendar event occurrence information specified by the restoration request. The manager may match the calendar event types and/or calendar event information specified in the restoration request to the calendar event information and calendar event occurrence information included in the backup metadata. For each calendar event that is associated with backup metadata that matches that which is included in the restoration request, the manager may include the user data associated with the calendar event in the portion of the user data associated with the restoration request. The manager may ignore the user data associated with all other calendar events included in the user data backup. The portion of calendar events included in the backup data of the user data backup may be identified based on the restoration request using the backup metadata of the user data backup via other and/or additional methods without departing from the invention.

In step 326, the calendar is restored using the backup data and backup metadata associated with the portion of the events.

In one or more embodiments of the invention, the calendar is restored using the backup data and backup metadata associated with the portion of calendar events by sending the portion of the user data backup, including the backup data and backup metadata, associated with the portion of calendar events to the client service provider and initiating restoration of the calendar using the portion of the user data backup. The manager of the storage may send a message to an application of the client service provider. The message may include the portion of the user data backup (i.e., backup data and backup metadata) associated with calendar events specified by the restoration request. The message may include other and/or additional information. The user data backup may be sent to an application of the client service provider via other and/or additional methods without departing from the invention.

In one or more embodiments of the invention, the manager of the storage sends an API call to the application of the client service provider to initiate a restoration using the portion of the user data backup. The API call may include a request to initiate the restoration of inaccessible user data stored on the client service provider using the portion of the user data backup. As a result, the application may restore the calendar using the portion of the user data. Thus the restored calendar may only include calendar events specified by the user in the restoration request. A restoration using the portion of the user data backup may be initiated via other and/or additional methods without departing from the invention.

The method may end following step 326.

Figure 4A:
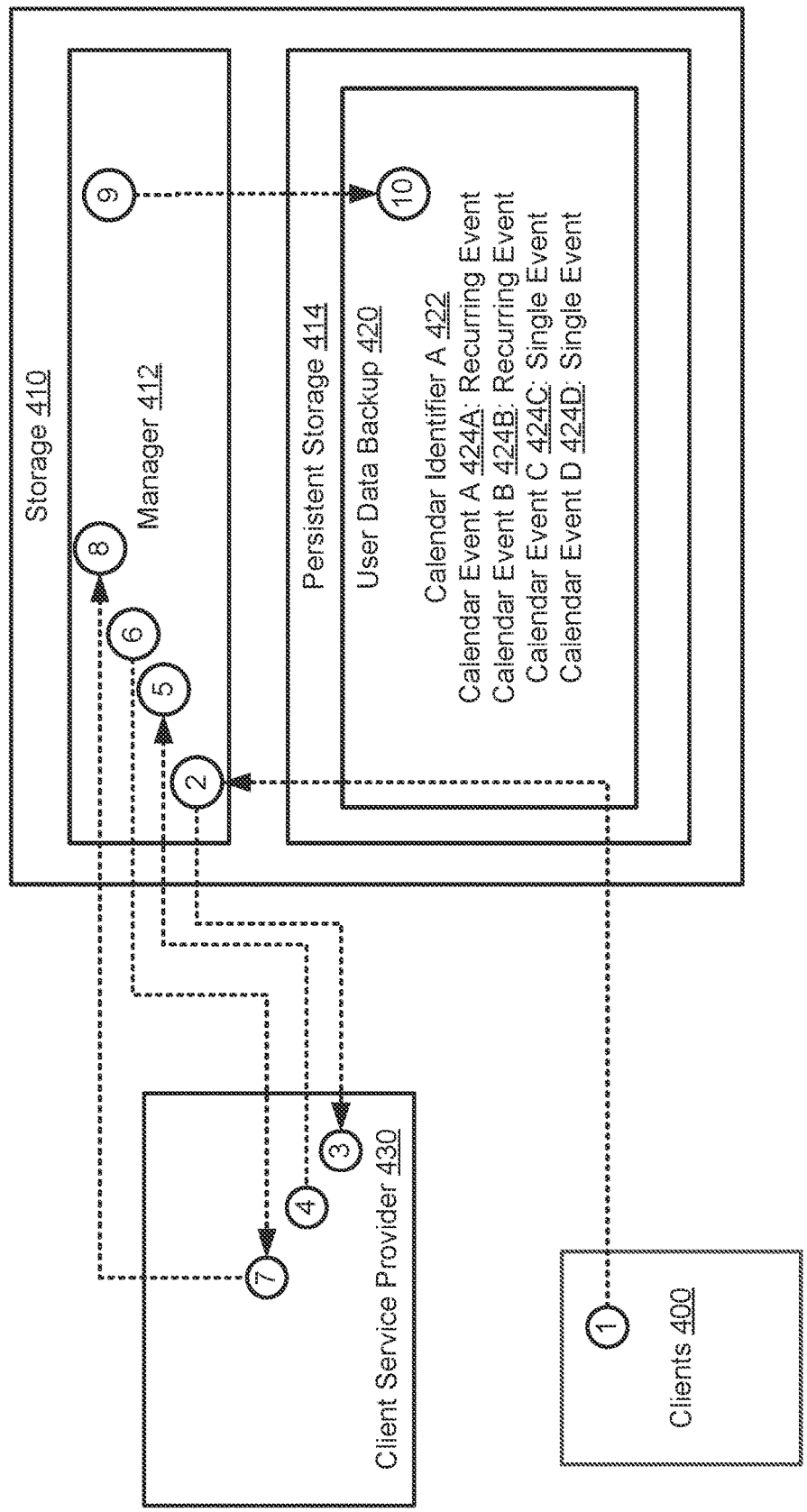
FIGS. 4A-4B show diagrams of the operation of a first example system over time in accordance with one or more embodiments of the invention.
Figure 4B:
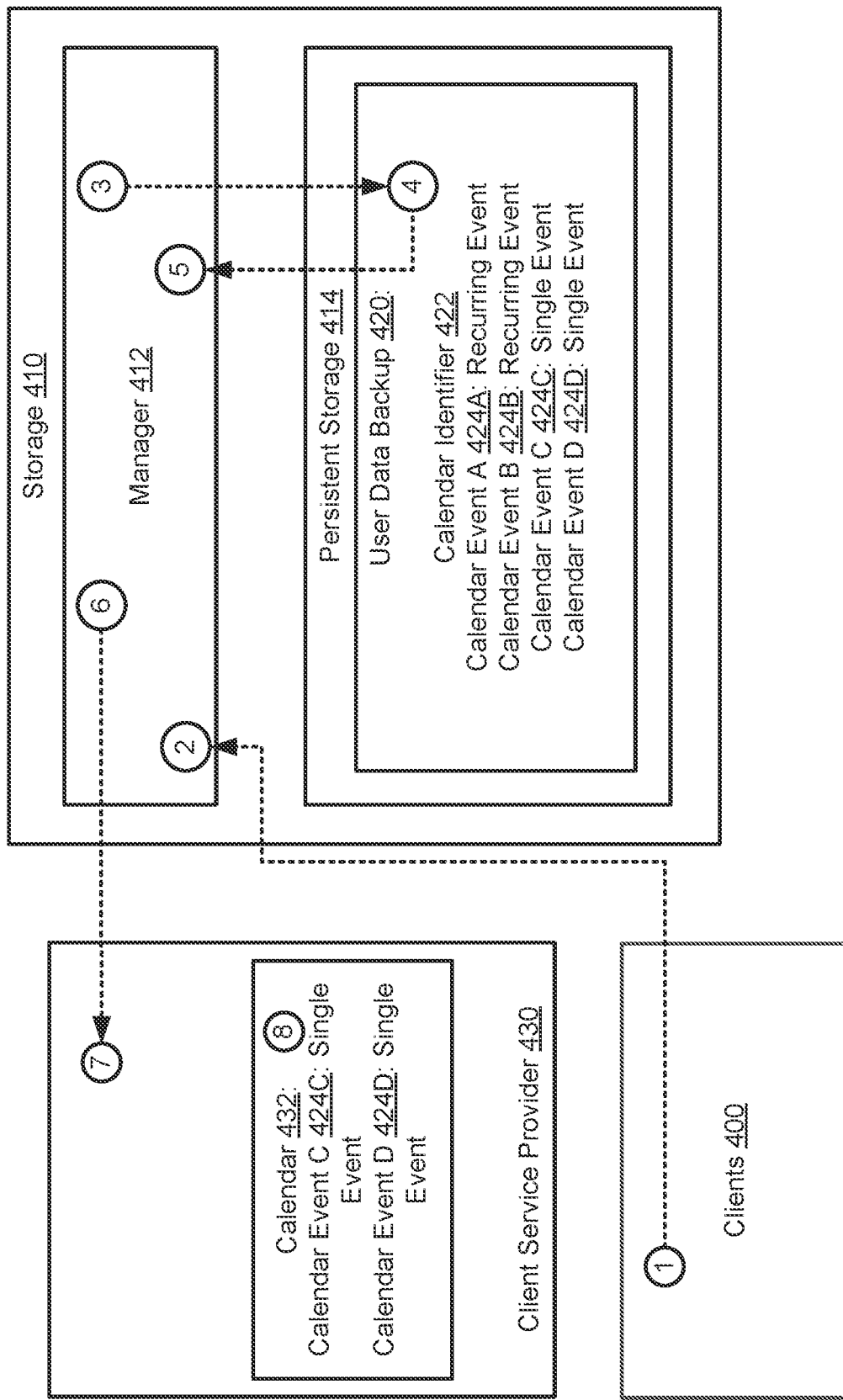

To further clarify embodiments of the invention, a first non-limiting example is provided in FIGS. 4A-4B. FIGS. 4A-4B show a system similar to that illustrated in FIG. 1A. Actions performed by components of the system are illustrated by numbered, circular boxes interconnected, in part, using the dashed lines. For the sake of brevity, only a limited number of components of the system of FIG. 1A is illustrated in FIGS. 4A-4B.

First Example

As discussed above, FIGS. 4A-4B show diagrams of the operation of a first example system over time in accordance with one or more embodiments of the invention.

Consider a scenario as illustrated in FIG. 4A in which clients (400) at step 1, send a protection policy to a manager (412) of a storage (410). The protection policy specifies guidelines for backing up user data associated with calendars that include calendar events, including a point in time in which a backup of the user data is to be generated. At step 2, the manager (412) identifies a protection policy event associated with user data stored on a client service provider (430). The protection policy event includes identifying, by the manager (412), the point in time specified in the protection policy. In response to identifying the protection policy event, at step 3, the manager (412) sends a message to the client service provider (430). The message includes a request for user data associated with the protection policy event. At step 4, after obtaining the message from the manager (412), the client service provider (430) identifies the user data associated with the user specified by the protection policy. At step 5, the client service provider (430) sends the user data to the manager (412).

After obtaining the user data, at step 6, the manager (412) selects a calendar included in the user data and sends a message to the client service provider (430). The message includes a request for user metadata associated with the calendar. At step 7, in response to obtaining the message, the client service provider (430) identifies and sends the user metadata associated with the calendar to the manager (412). At step 8, the manager (412) determines that no additional calendars are included in the user data. Based on the determination, at step 9, the manager (412) generates a user data backup (420) which includes calendar identifier A (422), calendar event A (424A), calendar event B (424B), calendar event C (424C), and calendar event D (424D). The user data backup (420) includes backup metadata that includes calendar event occurrence information. Based on the calendar event occurrence information associated with each calendar event, calendar event A (424A) and calendar event B (424B) are recurring events, and calendar event C (424C) and calendar event D (424D) are single events (i.e., occur only once). After the user data backup is generated, at step 10, the user data backup is stored in persistent storage (414) of the storage (410).

Turning to FIG. 4B, at step 1, some point in time after step 10 of FIG. 4A, user data (i.e., the calendar (432)) associated with the user data backup (420) becomes unavailable on the client service provider (430). At step 2, a restoration request is sent by a user of the clients (400) to the manager (412) of the storage specifying that the calendar (432) is to be restored. The restoration request includes the user identifier associated with the calendar (432). The restoration request also specifies that only single occurrence events are to be restored. In response to obtaining the restoration request, at step 3, the manager (412) identifies the user data backup (420) associated with the restoration request using the user identifier included in the restoration request and the user data backup (420). After identifying the user data backup (420), at step 4, the manager (412) identifies a portion of the user data backup associated with calendar events that are single occurrence events based on the restoration request and the backup metadata included in the user data backup (420). In this example, calendar event C (424C) and calendar event D (424D) are single events, so calendar event C (424C) and calendar event D (424D) are identified by the manager (412).

At step 5, the manager obtains the portion of the user data backup associated with calendar event C (424C) and calendar event D (424D) from persistent storage (414). At step 6, the manager (412) initiates the restoration of the calendar (432) using the portion of the user data backup associated with single events as specified by the restoration request. The manager (412) sends a first message that includes the portion of the user data backup to the client service provider (430). The manager (412) sends a second message to the client service provider (430) that includes a request to restore the calendar (432) using the portion of the user data backup. At step 8, the client service provider (430) restores the calendar using the portion of the user data backup. As a result, the calendar (432) includes only single events, i.e., calendar event C (424C) and calendar event D (424D), as desired by the user of the clients (400) and may now be used by the users when obtaining computer implemented services from the client service provider (430).

End of First Example

Thus, as illustrated in FIGS. 4A-4B, embodiments of the invention may provide a system that enables improved data protection services to be provided to user data gated by an application of a client service provider. User backups of user data associated with calendar events may be generated that may include calendar event information and calendar event occurrence information. The calendar event information and calendar event occurrence information enables the manager of the storage to initiate granular restorations of user data associated with calendars that may result in restored calendars that include calendar events of specific calendar event types and/or specific occurrence as specified by users of clients.

Figure 5A:
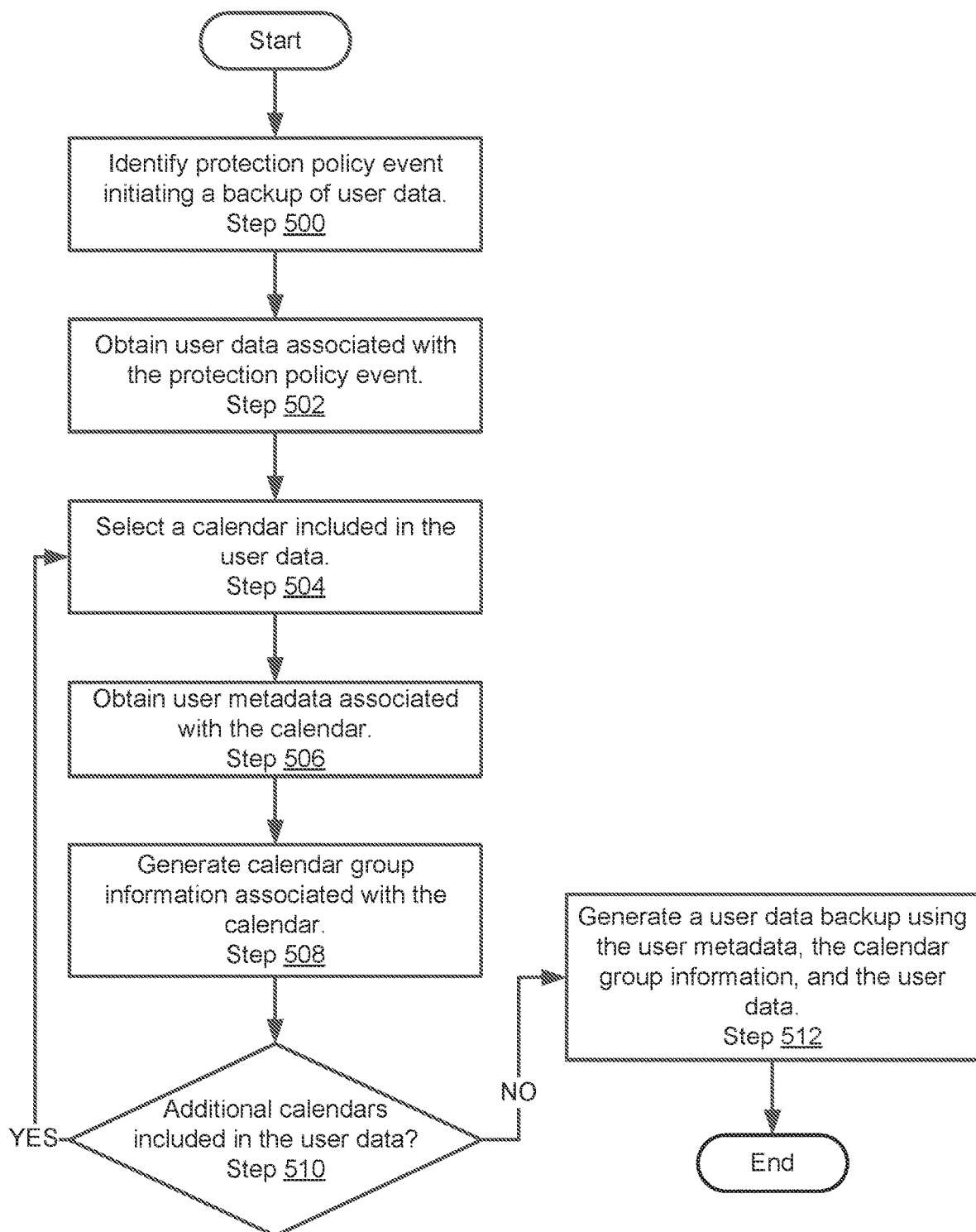
FIG. 5A shows a flowchart of a method of generating user data backup of user data associated with calendar groups in accordance with one or more embodiments of the invention.

FIG. 5A shows a flowchart of a method of generating user data backup of user data associated with calendar groups in accordance with one or more embodiments of the invention. The method may be performed by, for example, a manager (112, FIG. 1A) of the storage (110, FIG. 1A). Other components of the system in FIG. 1A may perform all, or a portion, of the method of FIG. 5A without departing from the invention.

While FIG. 5A is illustrated as a series of steps, any of the steps may be omitted, performed in a different order, additional steps may be included, and/or any or all of the steps may be performed in a parallel and/or partially overlapping manner without departing from the invention.

In step 500, a protection policy event initiating a backup of user data is identified.

As discussed above, protection policies may specify guidelines and/or requirements for protecting user data stored on the client service provider. The protection policies may specify events that trigger backups of user data. The manager of the storage may monitor the protection policies and identify the occurrence of the specified events in the protection policies. In response to the identification of the protection policy events, the manager of the storage may initiate the generation of a backup of user data.

For example, a protection policy may specify that user data of a user should be backed up once a week at noon on Sunday. The manager of the storage may monitor this protection policy as well as the time and date, and at noon every Sunday, may initiate backup generation of user data associated with the protection policy. The protection policy event initiating a backup of user data may be identified via other and/or additional methods without departing from the invention.

In step 502, user data associated with the protection policy event is obtained.

In one or more embodiments of the invention, the manager of the storage sends application interface programming (API) calls to the application of the client service provider to obtain the user data associated with the protection policy event. The user data may refer to information returned by the application that gates access to the user data repository in response to a query (e.g., an API call). The API calls may include requests for user data stored in user data repository of the client service provider associated with a user based on a user identifier. More specifically, the API calls may include requests for user data associated with a user that include creation timestamps after the timestamp of the most recent previous backup associated with the user data. One or more API calls may be made to the client service provider to obtain the user data without departing from the invention. The user data associated with the protection policy event may be obtained via other and/or additional methods without departing from the invention.

The API calls may include requests for user data based on timestamp analysis. A first API call may request a list of object identifiers associated with user data objects stored in the user data repository that were generated after a specific point in time. In response to the request, the client service provider may send a list of object identifiers associated with objects that were generated after the specified point in time. The storage may send additional API calls requesting the user data that are associated with the obtained object identifiers. In response to obtaining the API calls, the client service provider may send the requested user data to the storage. User data associated with the protection policy event may be obtained from the user data repository via other and/or additional methods without departing from the invention.

For example, a protection policy event may specify that a backup of user data is to be generated once a week at noon on Sunday. The manager may send one or more API calls requesting user data associated with the protection policy event. The API calls may request all user data generated after noon of the previous Sunday. In response to the API calls, the client service provider may identify user data generated after noon of the previous Sunday and send the identified user data to the storage.

When user data is obtained in step 502, the user data may be without context. For example, metadata that provides context for the user data may not be provided along with or otherwise in conjunction with the user data. Thus, the user data obtained in step 502 is fragmented with respect to other user data in the user data repository, backups of the user data repository, etc. Thus, the user data obtained in step 502, in isolation, may not be usable for backup generation purposes.

In step 504, a calendar included in the user data is selected.

As discussed above, the obtained user data may include data of one or more calendars associated with a user. The obtained user data may include a list of one or more calendar identifiers for which the calendars included in the user data may be associated. The manager of the storage may use the calendar identifiers included in the obtained user data to identify the calendars included in the user data. Thus, the calendar identifiers may be used to select a calendar included in the obtained user data to obtain user metadata associated with the selected calendar for generating a user data backup. The calendar may be selected and the user metadata for generating a user data backup may be identified based on the obtained user data via other and/or additional methods without departing from the invention.

For example, consider a scenario where the user data repository is a calendar database including calendars. Each of the calendars may be associated with a corresponding identifier (e.g., a reference to an entry in the database that includes the respective calendar information). The obtained user data may be two calendars. To use the calendars for restoration purposes, the identifiers of the corresponding database entries must be known. In this scenario, the user metadata may include the references to the database entries in which the calendars are stored. Consequently, when a restoration is performed, the reference to the entries may be provided along with the copy of the calendar data (e.g., calendar events) of the calendars to enable the entry of the database to be restored to an earlier state by, for example, overwriting the entry's contents, adding a new entry and changing its metadata to replace the previous entry, etc. The manager may select the first calendar identifier included in the list of calendar identifiers that was not previously selected. The calendar associated with the calendar identifier may be the selected calendar.

In step 506, user metadata associated with the calendar is obtained.

In one or more embodiments of the invention, the manager of the storage sends API calls to the application of the client service provider to obtain the identified user metadata associated with the user data associated with the selected calendar. The manager may send one or more API calls to the application of the client service provider. The API calls may include requests for user metadata that is associated with the selected calendar identifier that is stored in the user metadata repository in the client service provider. In response to obtaining the API calls, the application of the client service provider may send the requested user metadata to the storage. The user metadata associated with the calendar may be obtained via other and/or additional methods without departing from the invention.

In step 508, calendar group information associated with the calendar is generated.

As discussed above, the user data may be associated with a calendar that may be associated with a calendar group. The user metadata obtained in step 506 may specify that the calendar is associated with a particular calendar group. The calendar group may be the user parent calendar group or a calendar subgroup. The user metadata may also specify the parent calendar group of the calendar group associated with the calendar. The manager may generate calendar group information for the calendar using the user metadata. The manager may associate the calendar identifier with the calendar group identifier generated or obtained from the user metadata. The manager may also associate the parent calendar group identifier with the calendar identifier. The calendar group information may allow the restoration of the associated calendar under the appropriate calendar group and maintain an accurate hierarchy of calendar groups. The calendar group information associated with the calendar may be generated via other and/or additional methods without departing from the invention.

In step 510, a determination is made as to whether there are additional calendars included in the user data. After generating calendar group information associated with the previously selected calendar, the manager may identify the next calendar identifier included in the list of calendar identifiers, and thus determine that additional calendars are included in the user data. If there are no additional calendar identifiers and/or all of the calendar identifiers included in the list were previously selected, the manager may determine that there are no additional calendars included in the user data. It may be determined whether additional calendars are included in the user data via other and/or additional methods without departing from the invention.

If it is determined that additional calendars are included in the user data, then the method proceeds to step 504. If it is determined that additional calendars are not included in the user data, then the method proceeds to step 512. Steps 504, 506, 508, and 510 may be repeated until user metadata associated with each calendar included in the user data obtained in step 502 is obtained and calendar group information associated with each calendar is generated without departing from the invention.

In step 512, a user data backup is generated using the user metadata, the calendar group information, and the user data.

In one or more embodiments of the invention, the user data backup is generated by generating backup metadata using the user data and the user metadata and associated portions of the user data with portions of the backup metadata. As discussed above, the backup metadata may include the generated calendar event information, calendar event occurrence information, and calendar group information. The manager of the storage may generate calendar event information and calendar event occurrence information associated with each calendar included in the user data. The user metadata may include event information associated with each event specified by a user upon the creation of the event in a calendar. The manager may identify this information and generate calendar event information and calendar event occurrence information for each event of each calendar using the identified information. For each calendar, the manager may identify calendar event identifiers and use the user metadata to assign a calendar event type to the event associated with the event identifier and calendar event occurrence information that may specify whether an event is a single occurrence event (i.e., occurs only once) or a reoccurring event (i.e., occurs more than once). The backup metadata may be generated via other and/or additional methods without departing from the invention.

For example, for a calendar included in the user data, the manager identifies all calendar event identifiers associated with the calendar. The user metadata may include a list of calendar event identifiers associated with the calendar. The user metadata may include calendar entries associated with each calendar event generated by the user upon the creation of each event. In this scenario, this calendar includes two events. The first event is a meeting that occurs only once and the second event is an annual all-day event that occurs each year. The user metadata associated with the first event may specify a single time entry generated by the user upon the creation of the first event. The manager may assign the meeting calendar type to the calendar event identifier and generate calendar specification information that specifies the calendar event associated with the calendar identifier is a single occurrence event. The user metadata associated with the second event may specify a first entry that indicates the second event lasts twenty four hours and a second entry that indicates the event occurs on the same day each year. The manager assigns the all-day event calendar type to the calendar event identifier and generates calendar specification information that specifies the calendar event associated with the calendar identifier is a reoccurring event.

In one or more embodiments of the invention, each portion of the backup metadata is associated with a portion of the user data to generate a user data backup. Portions of the user data that include an event may be associated with portions of the calendar group information, calendar event information, and calendar event occurrence information of the backup metadata. The user data backup may be generated by associating the user data with the backup metadata via other and/or additional methods without departing from the invention.

For example, the manager of the storage may generate a user data backup that includes a list for each calendar event included in the user data of the user data backup. For each calendar event, the list may include references to the calendar in the user data in which the calendar event is included and all of the backup metadata associated with the calendar event. Additionally, the user data backup may include a list of calendar identifiers for each calendar included in the user data backup. For each calendar, the list may include the calendar group references to the calendar group associated with the calendars and the parent calendar group associated with each calendar that is associated with a calendar subgroup.

The method may end following step 512.

Figure 5B:
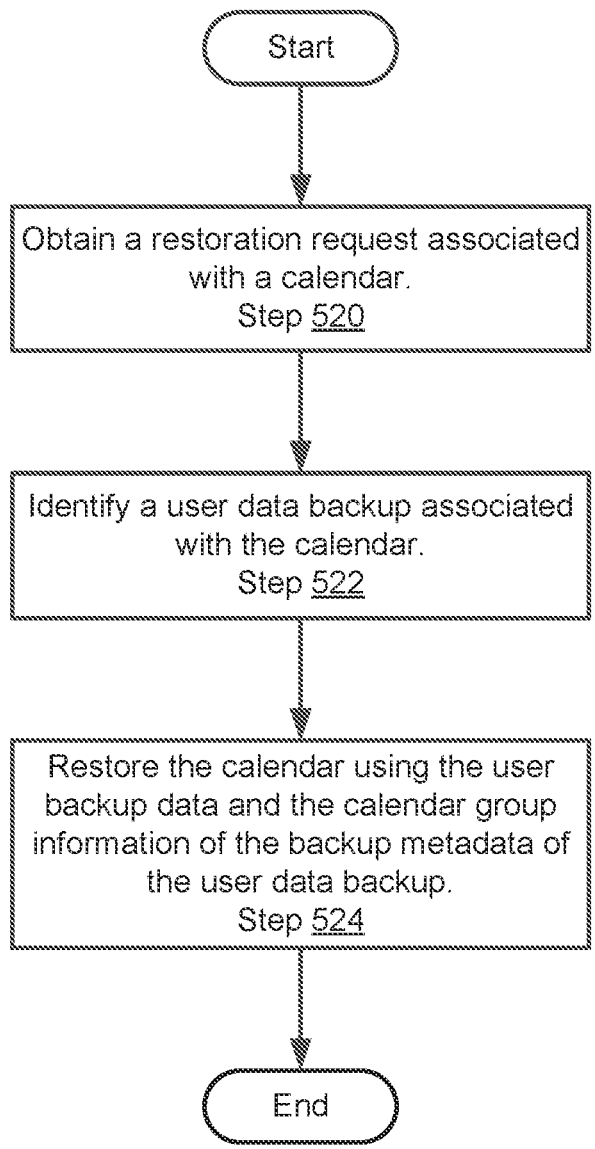
FIG. 5B shows flowchart of a method of user data associated with calendar groups using a user data backup in accordance with one or more embodiments of the invention.

FIG. 5B shows flowchart of a method of user data associated with calendar groups using a user data backup in accordance with one or more embodiments of the invention. The method may be performed by, for example, a manager (112, FIG. 1A) of the storage (110, FIG. 1A). Other components of the system in FIG. 1A may perform all, or a portion, of the method of FIG. 5B without departing from the invention.

While FIG. 5B is illustrated as a series of steps, any of the steps may be omitted, performed in a different order, additional steps may be included, and/or any or all of the steps may be performed in a parallel and/or partially overlapping manner without departing from the invention.

In step 520, a restoration request associated with a calendar is obtained.

User data stored on the client service provider may become inaccessible for any reason. The client service provider or a component within may perform or initiate a restoration that may be associated with a user data backup stored in the storage. Obtaining the restoration request may include receiving a message from the application of the client service provider and/or a user of the clients that requests the restoration of inaccessible user data using a user data backup. The message may include a user identifier and a calendar identifier to specify the user data backup requested by the application of the client service provider. The manager of the storage may identify the message from the client service provider as a restoration request and, in response to obtaining the restoration request, the manager of the storage may initiate the restoration using the specified user data backup. A restoration request associated with a user data backup may be obtained via other and/or additional methods without departing from the invention.

In one or more embodiments of the invention, a restoration request may specify a portion of the user data backup to be used to restore the user data instead of restoring the inaccessible user data with the entire user data. A user may desire to restore a calendar with only a portion of the calendar events included in the original calendar. The restoration request may specify one or more calendar event types and calendar event occurrence information associated with only desired calendar events to be restored using the user data backup.

In step 522, a user data backup associated with the calendar is identified.

In one or more embodiments of the invention, the manager identifies the user data backup associated with the calendar using the user identifier and the calendar identifier. The manager may identify the most recent user data backup by matching the user identifier included in the restoration request with the user identifier included in the most recent user data backup that also includes the calendar identifier. The user data backup associated with the calendar may be identified via other and/or additional methods without departing from the invention.

In step 524, the calendar is restored using the backup data and backup metadata of the user data backup.

In one or more embodiments of the invention, the calendar is restored using the backup data and backup metadata associated with the portion of user data backup that is associated with the calendar by sending the portion of the user data backup, including the backup data and backup metadata, associated with the calendar events to the client service provider and initiating restoration of the calendar using the portion of the user data backup. The manager of the storage may send a message to an application of the client service provider. The message may include the portion of the user data backup (i.e., backup data and backup metadata) associated with calendar events specified by the restoration request. The message may also specify the calendar group information associated with the calendar. The message may include other and/or additional information. The user data backup may be sent to an application of the client service provider via other and/or additional methods without departing from the invention.

In one or more embodiments of the invention, the manager of the storage sends an API call to the application of the client service provider to initiate a restoration using the portion of the user data backup. The API call may include a request to initiate the restoration of inaccessible user data stored on the client service provider using the portion of the user data backup. As a result, the application may restore the calendar using the portion of the user data and the calendar group information associated with the calendar. Thus the restored calendar may be under the appropriate calendar group as desired by the user without manual intervention. A restoration using the portion user data backup may be initiated via other and/or additional methods without departing from the invention.

The method may end after step 526.

Figure 6A:
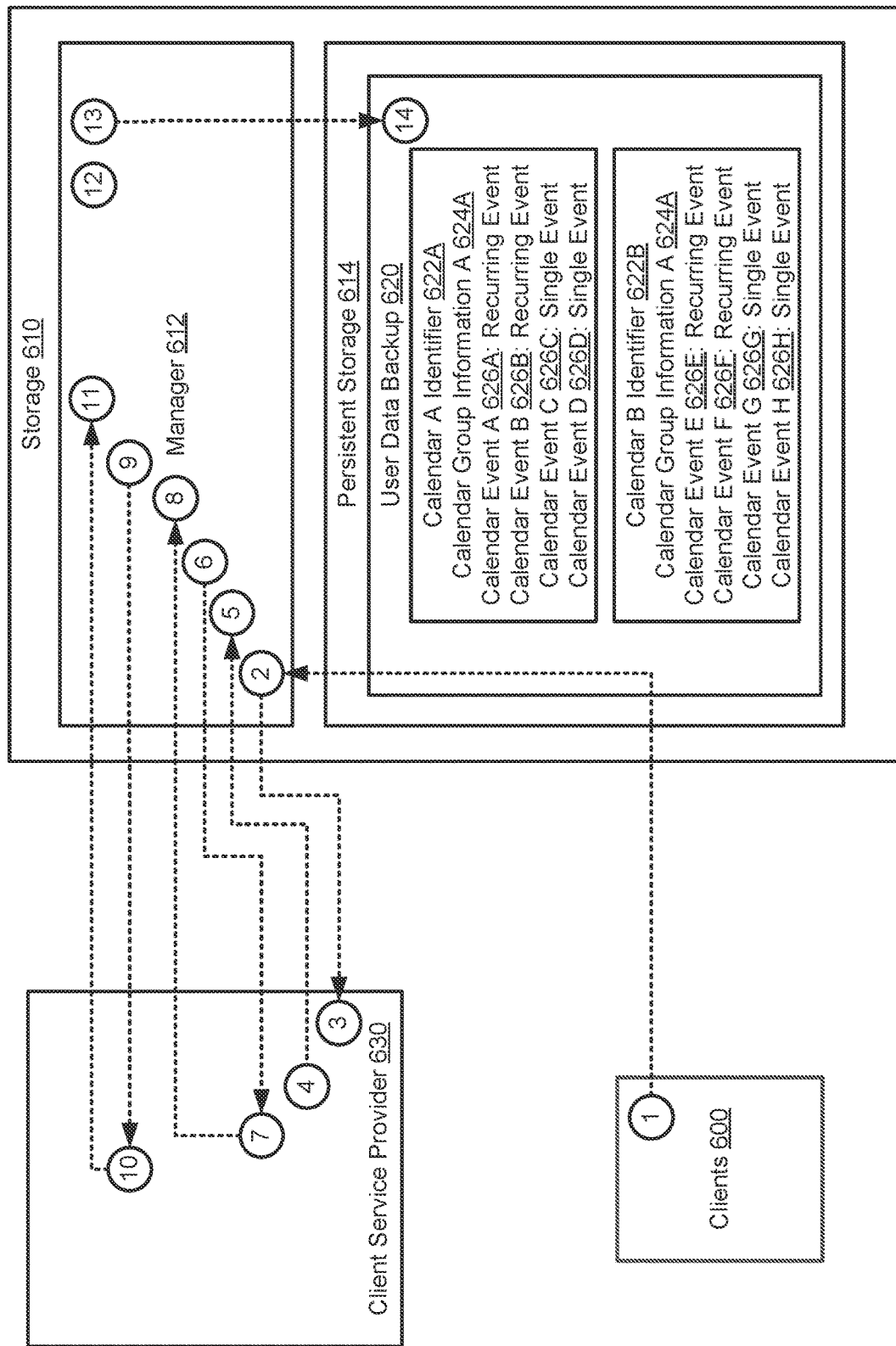
FIGS. 6A-6B show diagrams of the operation of a second example system over time in accordance with one or more embodiments of the invention.
Figure 6B:
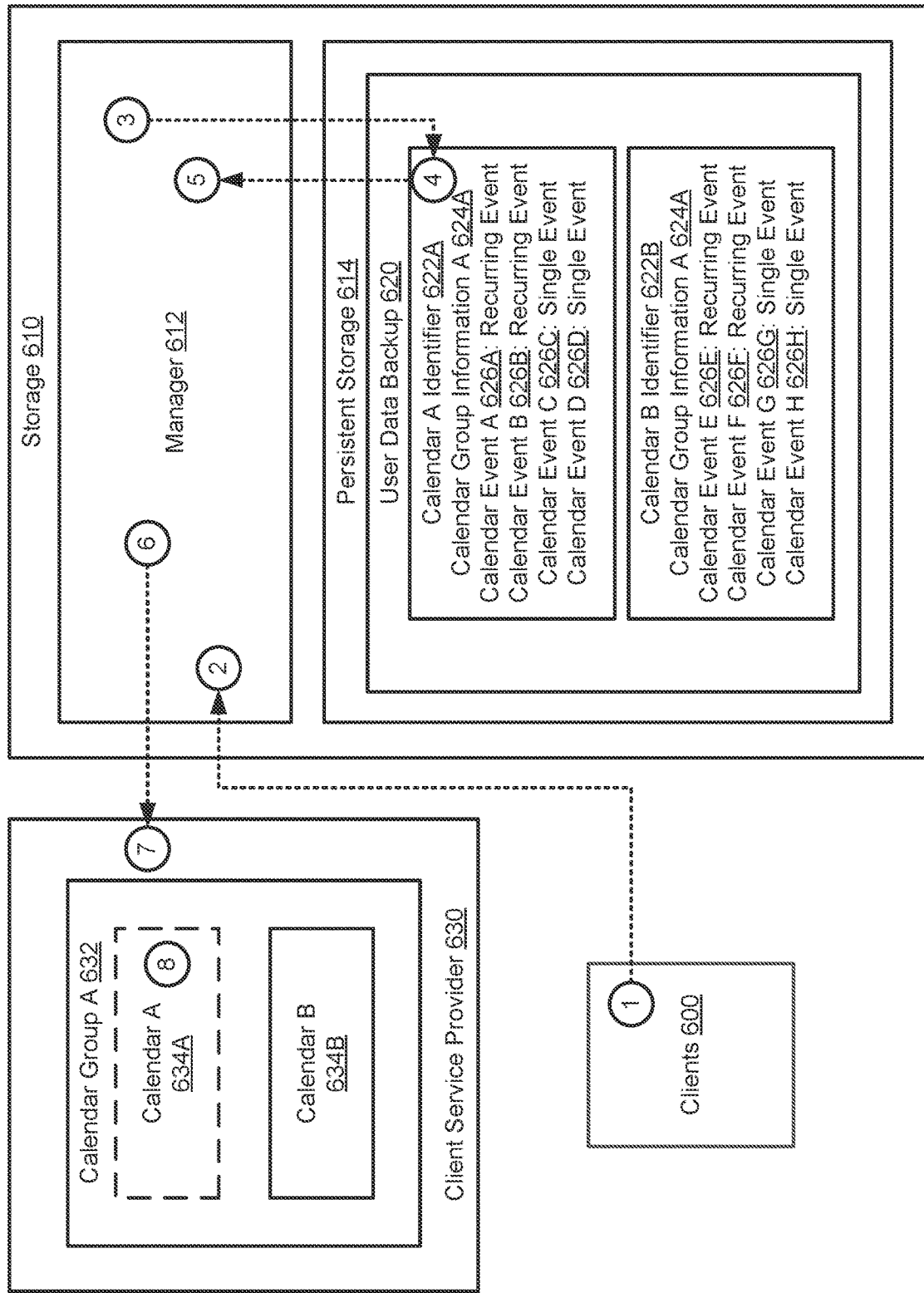

To further clarify embodiments of the invention, a first non-limiting example is provided in FIGS. 6A-6B. FIGS. 6A-6B show a system similar to that illustrated in FIG. 1A. Actions performed by components of the system are illustrated by numbered, circular boxes interconnected, in part, using the dashed lines. For the sake of brevity, only a limited number of components of the system of FIG. 1A is illustrated in FIGS. 6A-6B.

Second Example

Consider a scenario as illustrated in FIG. 6A in which clients (600) at step 1, send a protection policy to a manager (612) of a storage (610). The protection policy specifies guidelines for backing up user data associated with calendars that include calendar events and with calendar groups, including a point in time in which a backup of the user data is to be generated. At step 2, the manager (612) identifies a protection policy event associated with user data stored on a client service provider (630). The protection policy event includes identifying, by the manager (612), the point in time specified in the protection policy. In response to identifying the protection policy event, at step 3, the manager (612) sends a message to the client service provider (630). The message includes a request for user data associated with the protection policy event. At step 4, after obtaining the message from the manager (612), the client service provider (630) identifies the user data associated with the user specified by the protection policy. At step 5, the client service provider (630) sends the user data to the manager (612).

After obtaining the user data, at step 6, the manager (612) selects a first calendar included in the user data and sends message to the client service provider (630). The message includes a request for user metadata associated with the first calendar and includes a calendar A identifier (622A). At step 7, in response to obtaining the message, the client service provider (630) identifies and sends the user metadata associated with the first calendar to the manager (612). At step 8, the manager (612) generates calendar group information A (624A) associated with the first calendar using the user data and user metadata associated with the first calendar. At step 9, the manager (612) determines that an additional calendar is included in the user data, and the manager (612) selects a second calendar included in the user data and sends message to the client service provider (630). The message includes a request for user metadata associated with the second calendar and includes a calendar B identifier (622B). At step 10, in response to obtaining the message, the client service provider (630) identifies and sends the user metadata associated with the second calendar to the manager (612). At step 11, the manager (612) generates calendar group information A (624A) associated with the second calendar using the user data and user metadata associated with the second calendar. At step 12, the manager (612) determines that no additional calendars are included in the user data. Based on the determination, at step 13, the manager (612) generates a user data backup (620) which includes a calendar A identifier (622A), calendar group information A (624A), calendar event A (626A), calendar event B (626B), calendar event C (626C), and calendar event D (626D) associated with the first calendar, and a calendar B identifier (622B), calendar group information A (624A), calendar event E (626E), calendar event F (626F), calendar event G (626G), and calendar event H (626H) associated with the second calendar. The user data backup (620) includes backup metadata that includes calendar group A information (624A) associated with the first and second calendar included in the user data backup (620). After the user data backup (620) is generated, at step 14, the user data backup is stored in persistent storage (614) of the storage (610).

Turning to FIG. 6B, at step 1, some point in time after step 14 of FIG. 6A, user data associated with calendar A (634A) (i.e., the first calendar) associated with the user data backup (620) becomes unavailable on the client service provider (630). At step 2, a restoration request is sent by a user of the clients (600) to the manager (612) of the storage specifying that calendar A (634A) is to be restored. The restoration request includes the user identifier and the calendar identifier A (622A) associated with calendar A (634A). In response to obtaining the restoration request, at step 3, the manager (612) identifies the user data backup (620) associated with the restoration request using the user identifier included in the restoration request and the user data backup (620). After identifying the user data backup (620), at step 4, the manager (612) identifies a portion of the user data backup associated with calendar A (634A) using the calendar A identifier (622A).

At step 5, the manager obtains the portion of the user data backup associated with calendar A (634A) including calendar group information A (624A), calendar event A (626A), calendar event B (626B), calendar event C (626C), and calendar event D (626D). from persistent storage (614). At step 6, the manager (612) initiates the restoration of the calendar (632) using the portion of the user data backup associated with calendar A (434A) as specified by the restoration request. The manager (612) sends a first message that includes the portion of the user data backup to the client service provider (630). The manager (612) sends a second message to the client service provider (630) that includes a request to restore the calendar (632) using the portion of the user data backup. At step 8, the client service provider (630) restores the calendar using the portion of the user data backup including the calendar group information A (624A). As a result, calendar A (634A) is restored under calendar group A (632) as specified by calendar group information A (624A) and may now be used by the users when obtaining computer implemented services from the client service provider (630).

End of Second Example

Thus, as illustrated in FIGS. 6A-6B, embodiments of the invention may provide a system that enables improved data protection services to be provided to user data gated by an application of a client service provider. User backups of user data associated with calendar groups may be generated that may include calendar group information. The calendar group information enables the manager of the storage to initiate restorations of user data associated with calendars that result in the calendar being restored under the appropriate calendar group.

Figure 7:
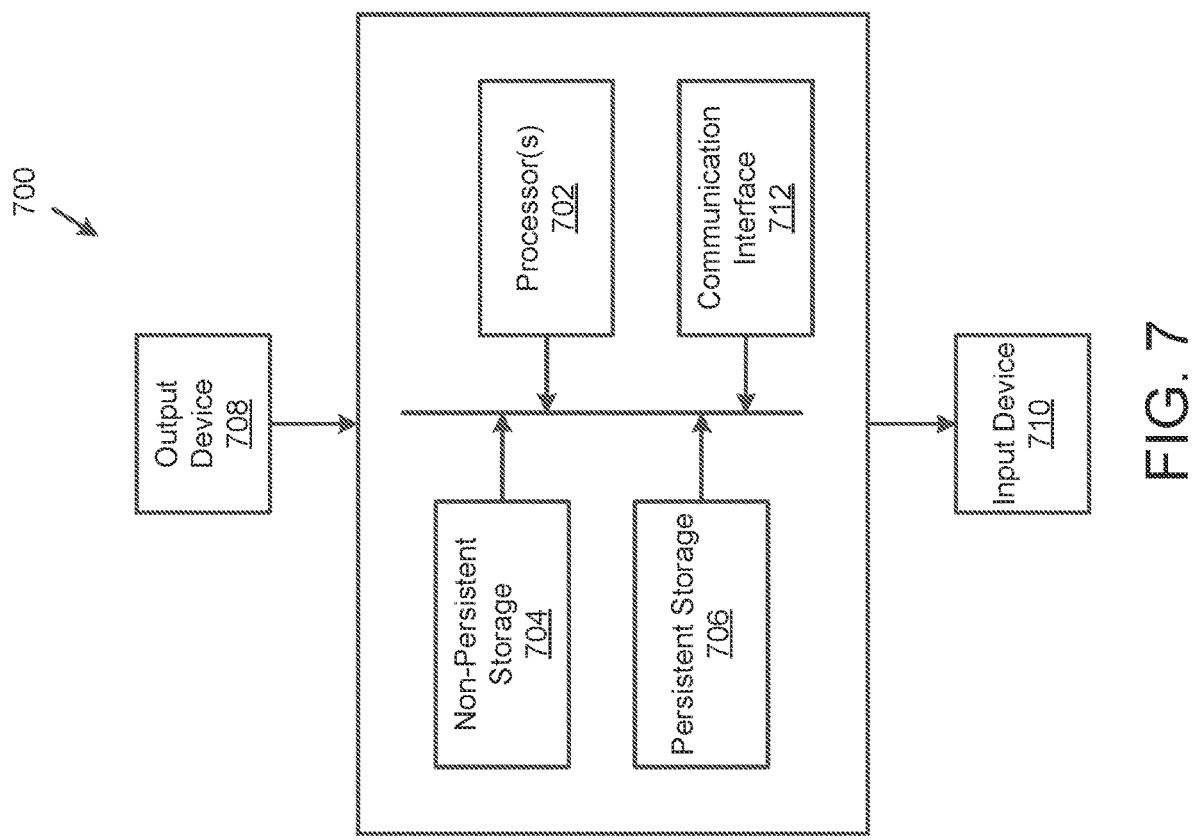
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to generating user data backups of user data associated with calendar events gated by an application of a client service provider. The user data backups include backup metadata, which includes calendar group information that specifies the parent calendar group associated with each calendar included in the user data backup. The user data backups enable a manager of the storage to restore calendars associated with calendar groups using the calendar group information. As a result, calendars may be restored under the appropriate calendar group.

In traditional systems, restored calendars associated with calendar groups may not be under the appropriate calendar group, resulting in inaccurate restoration of user data, which may require a user to manually move the restored calendars to the appropriate calendar groups. Embodiments of the invention improve the computational efficiency and accuracy of restoring user data associated with calendar groups by generating user data backups that include calendar group information that enables restorations of calendars under appropriate calendar groups.

Thus, embodiments of the invention may address the problem of inefficient use of computing resources to store and protect user data in a client service provider. This problem arises due to the nature of the technological environment in which the data of the data cluster is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A system for providing data protection services for user data associated with calendar groups generated by an application, comprising:
   persistent storage for storing user data backups; and
   a manager programmed to:
   identify a backup generation event for the user data associated with a calendar group based on a protection policy;
   in response to identifying the backup generation event:
   obtain user data associated with the backup generation event from the application;
   select a calendar of calendars included in the user data;
   obtain user metadata associated with the calendar;
   generate calendar group information associated with the calendar using the user data and the user metadata;
   generate a user data backup using the user data, the calendar group information, and the user metadata, wherein the user data backup comprises backup data and backup metadata.

2. The system of claim 1, wherein the manager is further programmed to:
   after the generation of the user data backup:
   obtain a restoration event associated with the user data;
   in response to identifying the restoration event:
   identify the user data backup associated with the restoration event;
   restore the user data using the backup data and the backup metadata, wherein the restored user data is associated with the calendar group.

3. The system of claim 2, wherein the calendar group information is generated to enable the application to associate the restored user data to the calendar group.

4. The system of claim 2, wherein the user data comprise calendars.

5. The system of claim 4, wherein the calendar group information specifies a topology associated with the calendars in the calendar group.

6. The system of claim 5, wherein the calendar group comprises at least one selected from a group consisting of:
   a calendar subgroup; and
   a calendar.

7. The system of claim 5, wherein the restored user data is associated with a position in the topology associated with the calendar group.

8. A method for providing data protection services for user data associated with calendar groups generated by an application, comprising:
   identifying a backup generation event for the user data associated with a calendar group based on a protection policy;
   in response to identifying the backup generation event:
   obtaining user data associated with the backup generation event from the application;
   selecting a calendar of calendars included in the user data;
   obtaining user metadata associated with the calendar;
   generating calendar group information associated with the calendar using the user data and the user metadata;
   generating a user data backup using the user data, the calendar group information, and the user metadata, wherein the user data backup comprises backup data and backup metadata.

9. The method of claim 8, further comprising:
   after generating the user data backup:
   identifying a restoration event associated with the user data;
   in response to identifying the restoration event:
   identifying the user data backup associated with the restoration event;
   restoring the user data using the backup data and the backup metadata, wherein the restored user data is associated with the calendar group.

10. The method of claim 9, wherein the calendar group information is generated to enable the application to associate the restored user data to the calendar group.

11. The method of claim 9, wherein the user data comprise calendars.

12. The method of claim 11, wherein the calendar group information specifies a topology associated with the calendars in the calendar group.

13. The method of claim 12, wherein the calendar group comprises at least one selected from a group consisting of:
   a calendar subgroup; and
   a calendar.

14. The method of claim 12, wherein the restored user data is associated with a position in the topology associated with the calendar group.

15. A non-transitory computer readable medium comprising computer readable program code, which when executed by a computer processor enables the computer processor to perform a method for providing data protection services for user data associated with calendar groups generated by an application, the method comprising:
   identifying a backup generation event for the user data associated with a calendar group based on a protection policy;
   in response to identifying the backup generation event:
      obtaining user data associated with the backup generation event from the application;
      selecting a calendar of calendars included in the user data;
      obtaining user metadata associated with the calendar;
      generating calendar group information associated with the calendar using the user data and the user metadata;
      generating a user data backup using the user data, the calendar group information, and the user metadata, wherein the user data backup comprises backup data and backup metadata.

16. The non-transitory computer readable medium of claim 15, wherein the method further comprises:
   after generating the user data backup:
      identifying a restoration event associated with the user data;
      in response to identifying the restoration event:
         identifying the user data backup associated with the restoration event;
         restoring the user data using the backup data and the backup metadata, wherein the restored user data is associated with the calendar group.

17. The non-transitory computer readable medium of claim 16, wherein the calendar group information is generated to enable the application to associate the restored user data to the calendar group.

18. The non-transitory computer readable medium of claim 16, wherein the user data comprise calendars.

19. The non-transitory computer readable medium of claim 18, wherein the calendar group information specifies a topology associated with the calendars in the calendar group.

20. The non-transitory computer readable medium of claim 19, wherein the calendar group comprises at least one selected from a group consisting of:
   a calendar subgroup; and
   a calendar.

* * * * *